United States Patent [19]

Graham et al.

[11] 4,325,123

[45] Apr. 13, 1982

[54] ECONOMY PERFORMANCE DATA AVIONIC SYSTEM

[75] Inventors: Donald A. Graham, Redmond; Delwin R. Hoffman, Kirkland; Peter M. Morton, Redmond, all of Wash.

[73] Assignee: The Boeing Company, Seattle, Wash.

[21] Appl. No.: 929,011

[22] Filed: Jul. 28, 1978

[51] Int. Cl.³ .............................................. G06F 15/50

[52] U.S. Cl. .............................. 364/431.07; 244/182; 364/442

[58] Field of Search ............... 364/105, 431, 433, 442; 244/182

[56] References Cited

U.S. PATENT DOCUMENTS

| | | | |
|---|---|---|---|
| 2,687,612 | 8/1954 | Anderson et al. | 60/39.28 |
| 2,701,111 | 2/1955 | Schuck | 244/77 |
| 2,955,464 | 10/1960 | Elwell, Jr. | 73/198 |
| 2,992,558 | 7/1961 | Newell et al. | 364/442 X |
| 3,088,669 | 5/1963 | Sauer et al. | 235/193 |
| 3,153,143 | 10/1964 | F ogarty | 235/184 |
| 3,174,284 | 3/1965 | McCarthy | 60/39.16 |
| 3,221,759 | 12/1965 | Banning, Jr. | 137/18 |
| 3,295,796 | 1/1967 | Gaylor | 244/77 |
| 3,322,375 | 5/1967 | Larson | 244/77 |
| 3,347,092 | 10/1967 | Stutson | 73/114 |
| 3,533,579 | 10/1970 | Moller | 244/77 |
| 3,538,760 | 11/1970 | Atkey et al. | 73/117.4 |
| 3,589,648 | 6/1971 | Gorham et al. | 244/77 A |
| 3,612,837 | 10/1971 | Brandau | 364/442 X |
| 3,641,323 | 2/1972 | Hughes et al. | 235/150.2 |
| 3,648,033 | 3/1972 | Bader | 235/150.22 |
| 3,691,356 | 9/1972 | Miller | 235/150.22 |
| 3,697,731 | 10/1972 | Kempema et al. | 364/442 X |
| 3,748,900 | 7/1973 | Lindquist | 73/178 R |
| 3,758,764 | 9/1973 | Harner | 235/150.2 |
| 3,764,785 | 10/1973 | Harner et al. | 235/150.21 |
| 3,774,017 | 11/1973 | Zagalsky | 235/150.2 |
| 3,813,063 | 5/1974 | Martin | 364/431 X |
| 3,836,690 | 9/1974 | Purtle, Jr. | 35/10.2 |
| 3,852,956 | 12/1974 | Martin | 60/39.15 |
| 3,908,934 | 9/1975 | Schloeman | 244/770 |
| 3,958,107 | 5/1976 | Edelson et al. | 235/150.21 |
| 4,032,093 | 6/1977 | Bonne et al. | 244/180 |
| 4,038,526 | 7/1977 | Eccles et al. | 235/150.1 |
| 4,063,072 | 12/1977 | Sochtig et al. | 364/442 X |
| 4,086,632 | 4/1978 | Lions | 364/444 |
| 4,130,863 | 12/1978 | Schweitzer et al. | 364/105 |

FOREIGN PATENT DOCUMENTS

| | | | |
|---|---|---|---|
| 851576 | 9/1970 | Canada | 364/442 |
| 1258392 | 12/1971 | United Kingdom | 235/150.1 |

OTHER PUBLICATIONS

R. F. Stengel et al., "Energy Management for Fuel Conservation in Transport Aircraft", *IEEE Trans. on Aero. & Elect. Sys.*, V. AES-12, N. 4, 7-1976, pp. 464-470.

Elson, "Fuel-Saving Computer System Studied", *Aviation Week and Space Technology*, Mar. 7, 1977.

"Introducing the Airborne Performance Data Computer System", by Lear Siegler, Inc.

*Primary Examiner*—Jerry Smith

*Attorney, Agent, or Firm*—Christensen, O'Connor, Johnson & Kindness

[57] ABSTRACT

An avionic system for producing the most economical engine thrust and airspeed settings in readily usable form during a jet aircraft flight is disclosed. The pilot inserts: the elevation of the destination airport; the zero fuel weight of the aircraft; the reserve fuel needed for the flight; the outside air temperature at the departure airport; and, a flight index number. The flight index number represents a chosen relationship between fuel costs and trip time-related costs. The system also receives data from various aircraft subsystems and sensors and uses the information it receives, and stored information, to produce signals representing the most economical engine thrust setting and airspeed for the phases of a flight. The thrust setting and airspeed signals drive bugs on thrust and airspeed indicators and/or used to control autothrottle/autopilot systems. The throttles and pitch attitude of the aircraft are controlled so that the indicator readings "track" the bug positions to cause the aircraft to follow the most economical flight path based on the chosen flight index number. Engine thrust limits are prevented from being exceeded by comparing calculated thrust values with stored engine thrust limit settings; and, using the maximum values to control the position of the thrust indicator bugs and the digital display. Still further, the system develops an aircraft idiosyncrasy factor (K) that is used to modify calculated thrust values in order to compensate for the drag and thrust peculiarities of the aircraft, zero fuel weight errors, etc.

64 Claims, 27 Drawing Figures

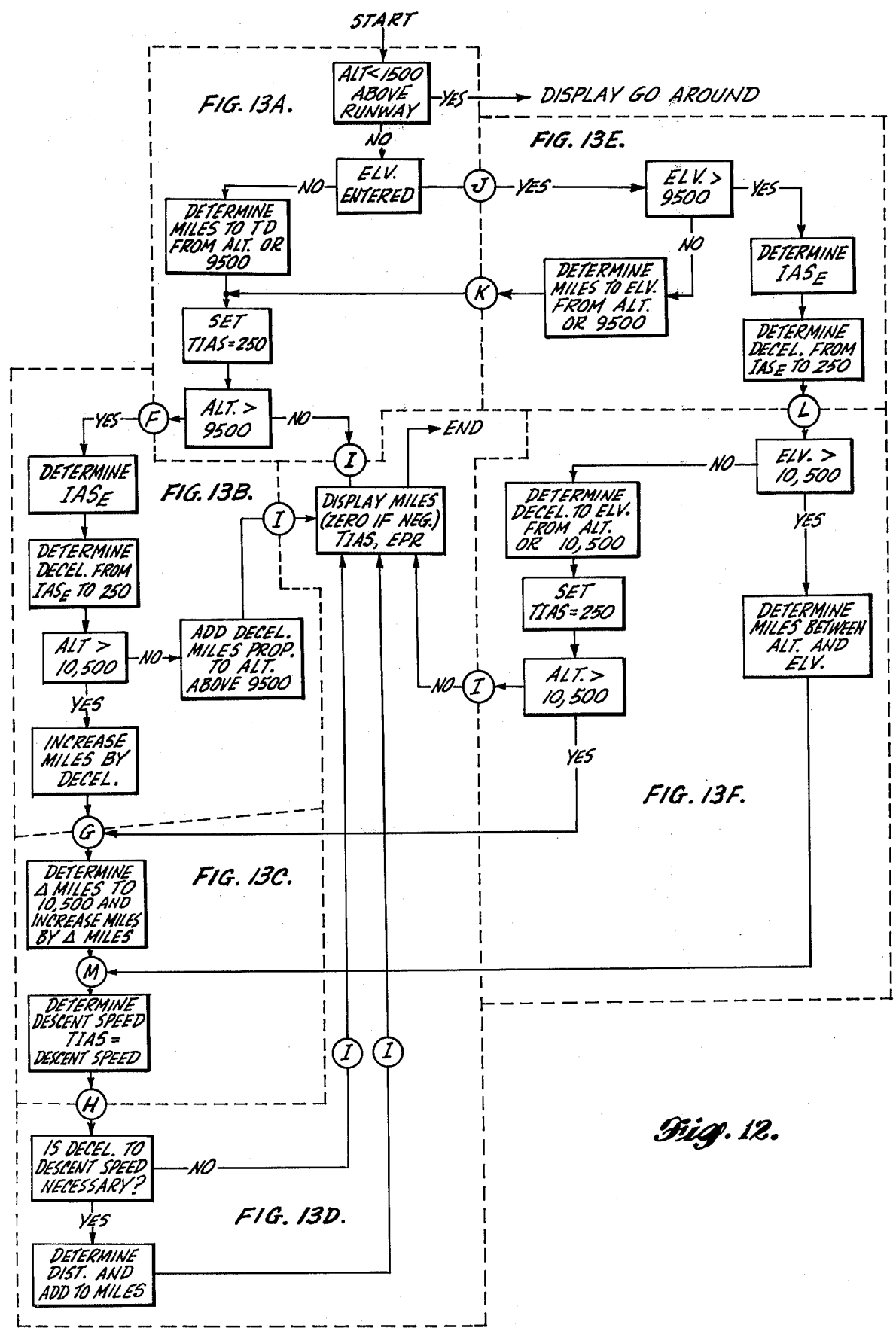

ECONOMY PERFORMANCE DATA AVIONIC SYSTEM

BACKGROUND OF THE INVENTION

This invention is directed to avionic systems and, more particularly, to the avionic systems that are used to guide aircraft, in particular jet aircraft.

In the past, because avionic systems have not had the ability to continuously determine the correct speed necessary to obtain the most economical operation during a flight, simplified speed schedules, which approximate maximum economy under average conditions, have been developed. During climb, a constant Mach/airspeed approximation tending to minimize climb time for heavier takeoff weights has usually been adopted. During cruise, most airlines select a constant Mach number giving a reasonable balance between fuel and flight time related costs for the major routes flown by the airlines. During descent, constant Mach/airspeed schedules are used, and the pilot's judgment is relied upon to minimize descent undershoot or overshoot.

As fuel prices have risen, the constant speed approximations discussed in the preceding paragraph have lost validity because economical speeds now vary more with gross weight (and burnoff) than they previously did. The fuel penalty of off-optimum operation, which can occur by following constant speed approximations, has become severe enough to create a desire for a means of providing better information for use by either a pilot or an autopilot so that the most economical flight profile can be followed during the climb, cruise and descent phases of a flight.

While various attempts have been made to provide economy aircraft guidance information in pilot or autopilot usable form, these attempts have had a number of disadvantages. In many of the suggested pilot systems, the produced information has not been given to pilots in an easily usable form, requiring minimum effort on the pilot's part. Further, many of these systems, regardless of whether adapted for use by pilots or autopilots, have not been able to accommodate differing fuel prices, time costs and schedule constraints that vary from airline to airline and route to route. Moreover, in general, these systems have not dealt effectively with variations between individual aircraft in the areas of thrust, drag, lift, instrumentation, etc.

Therefore, it is an object of this invention to provide a new and improved avionic system that is useful in guiding an aircraft so that a predetermined flight profile is readily followed.

It is another object of this invention to provide a new and improved avionic system adapted to guide an aircraft along the most economical flight profile between a departure airport and a destination airport.

It is another object of this invention to provide a new and improved avionic system adapted to guide an aircraft along the most economical flight profile that takes into consideration factors such as fuel price, time costs, variations between individual aircraft in thrust, drag, instrumentation, etc.

It is yet another object of this invention to provide an avionic system suitable for use in an aircraft to provide information in readily usable pilot form that allows a pilot to fly the most economical flight profile between takeoff and landing, with minimal effort.

SUMMARY OF THE INVENTION

In accordance with this invention, an avionic system that produces engine thrust and airspeed information in a form that is readily usable to guide an aircraft so that it follows the most economical flight profile (based on a pilot inserted index value) during the climb, cruise and descent phases of a flight is provided. The preferred form of the avionic system includes a control display unit (CDU), a data processor, and thrust and airspeed instruments. The data processor stores certain aircraft and flight data in "look-up" tabular form. The data processor also receives pilot inserted information via the CDU, as well as continuous inputs from other aircraft subsystems and sensors. In accordance with the information the data processor receives, it produces control signals that control the position of bugs located around the periphery of the thrust and airspeed indicators. The bugs are preferably servo driven and their position denotes target airspeed in the case of the airspeed indicator and target thrust values in the case of the thrust indicators. In order to fly the desired flight path, i.e., the flight path providing the most economical flight, the pilot first adjusts the aircraft's engines such that the thrust readings are the same as the target thrust values denoted by the positions of the thrust bugs. During climb and descent the pilot also controls the aircraft's pitch attitude such that the airspeed reading is the same as the target airspeed value denoted by the position of the airspeed bug. While the presently preferred form of thrust indicator is an engine pressure ratio (EPR) indicator and, thus, the thrust information is in EPR form, other types of thrust indicators can be used. For example, the indicators could be "low pressure" rotor speed ($N_1$) indicators, in which case the thrust information would be in $N_1$ form.

In accordance with other aspects of this invention, the data processor also produces display control signals that are applied to the CDU. The display control signals control displays of the target information, i.e., target airspeed and EPR information. As a result, the pilot is provided with at least two sources of the same target information (the bugs and a digital display on the CDU) during the various phases of the flight. If desired, the CDU display can be used to display information regarding an up-coming flight phase, prior to that information being used to position the bugs of the EPR and airspeed indicators. Further, since the EPR values during descent are normally set to idle thrust values, rather than EPR values being displayed during descent, a miles to go value is calculated and displayed. The miles to go value may either be the miles to touchdown, if no navigation beacon is available (or specified by the air traffic controller) at the destination airport, or miles to the navigation beacon, if one is specified by the air traffic controller at the destination airport in conjunction with a crossing altitude.

In accordance with further aspects of this invention, the data processor includes a cruise mode subroutine path that calculates a correction factor (K). The correction factor modifies the target EPR values in a manner that compensates for aircraft peculiarities. Specifically, aircraft are not exactly identical and certain of their characteristics change with engine and aircraft aging. More specifically, the rigors of daily service create dimples, wrinkles, dents and scratches on the surface components and seals of the aircraft, these items change the drag characteristic of the aircraft. Similarly, a flap or leading edge slat that is slightly misrigged, a damaged cargo door seal, and the like change the drag characteristics of an aircraft. Also thrust characteristics change as gas-path inefficiencies propagate in an engine. Finally, errors or simplifications in aircraft loading procedures will produce a calculated aircraft weight that is slightly different than the real weight, whereby the real drag will be different than the calculated drag. No matter how carefully target EPR values are calculated, an aircraft may not be able to maintain the related target airspeed value during cruise because of these aircraft characteristic variations and changes. The invention overcomes this problem by developing a cruise thrust self-correction factor (K) that modifies the target EPR thrust values or settings such that the target airspeed value can be achieved. Preferably, the self-correction factor can be displayed on the CDU for readout by maintenance personnel. Unduly large self-correction factors will alert maintenance personnel that the aircraft should be thoroughly examined to determine the cause of the high correction factor.

In accordance with further aspects of this invention, the data processor includes a series of subroutines. The first subroutine is a data conditioning subroutine that is started when power is turned on. The data conditioning subroutine sets certain values to zero and requests that certain information be loaded via the CDU. Prior to takeoff the data conditioning subroutine cycles through a series of steps that causes readings obtained from other aircraft subsystems and sensors to be averaged. After takeoff, during climb, cruise and descent, a pass is made through the data conditioning subroutine prior to a pass being made through the appropriate flight phase subroutine. The flight phase passes through the data conditioning subroutine result in the updating (and averaging) of the readings obtained from other aircraft subsystems and sensors.

In addition to the data conditioning subroutine, the data processor includes a climb mode subroutine, a cruise mode subroutine and a descent mode subroutine. These subroutines calculate target EPR and airspeed bug control signals for the most economical climb, cruise and descent flight paths. During a pass through these subroutines, stored aircraft and flight information is electronically looked up, based on calculated values and/or the value of the data received from other aircraft subsystems or sensors. All of the subroutines use the index value, which is a dimensionless number that represents a chosen relationship between fuel costs and trip time costs. More specifically, during the data conditioning subroutine, the pilot inserts an index value, which is then used by the data processor as its basis for looking up certain information used in selected calculations. Flight index values for each route are calculated by airline economic departments and are based on trip costs (which are truly a function of flight time), and station fuel prices. Flight index values may vary due to seasonal performance considerations as well as fluctuating economic situations and changing fuel prices. Crew duty and layover requirements may also affect the values. In any event, the chosen flight index value, in essence, controls the flight path. And, the flight index values are chosen on the basis of flight economy. The pilot merely looks up and enters the appropriate flight index into the data processor via the CDU prior to the flight. The pilot does not need to be concerned with how the number he uses is derived. A primary advantage of the invention, in addition to improving economical performance, is that it allows the airline head office to gain better control of operating costs. Further, speeding up to regain schedules can be regulated by establishing a policy of selecting an arbitrary flight index value which places greater value on time in proportion to the number of minutes a flight is behind schedule.

It will be appreciated from the foregoing summary that the invention provides an avionic system that is easily used by a pilot to fly the most economical performance path for a given flight. The invention is easy to use in pilot-controlled aircraft because the pilot merely needs to track the EPR and airspeed indicator bugs. The invention is "pilot usable" because information does not need to be transferred from one location, such as a display location, to other locations, such as EPR and airspeed indicator locations. Moreover, the invention does not require that the pilot perform any calculations, or look up any values in graphs or tables. Rather, all the pilot need do is enter certain readily available information at the beginning of a flight. Thereafter, by merely requesting that the bugs be driven by the control signals appropriate for the particular flight phase, the pilot is immediately provided with information regarding the thrust and airspeed settings needed to fly the most economical flight path. Alternatively, the signals driving the bugs can be used to control autothrottles and/or autopilots such that the pilot is removed from the aircraft control loop, but maintains a monitoring role by observing the bugs and other flight instruments.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 12 is a generalized flow diagram illustrating the descent mode subroutine of the data processor;

DESCRIPTION OF THE PREFERRED EMBODIMENT

Figure 1:
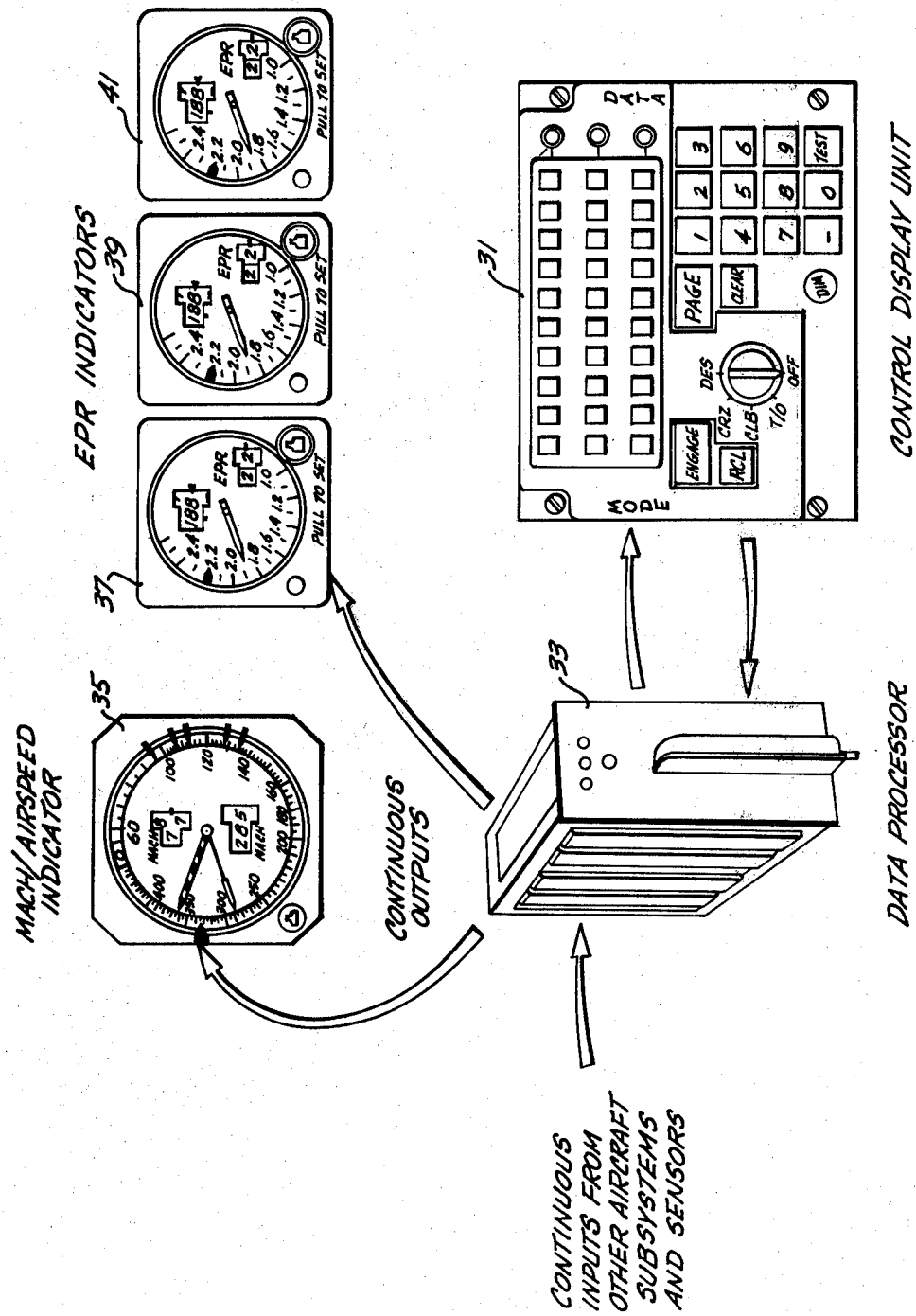
FIG. 1 is a pictorial diagram of the major components of an economy performance data avionic system formed in accordance with the invention.

FIG. 1 is a pictorial diagram illustrating the major components of a preferred embodiment of an economy performance data avionic system formed in accordance with the invention and comprises: a control display unit (CDU) 31; a data processor 33; a Mach/airspeed indicator 35; and, three EPR indicators 37, 39 and 41. (It is assumed for purposes of discussion that the jet aircraft with which the present invention is being utilized is a three engine aircraft, such as the Model 727 produced by The Boeing Company, Seattle, Washington. Contrariwise, if the aircraft is a two engine aircraft or a four engine aircraft, a corresponding number of EPR indicators are utilized. That is, an EPR indicator is provided for each engine of the aircraft, as will be readily understood by those skilled in the jet aircraft art. Furthermore, it is to be understood that the EPR indicators are merely examples of thrust indicators and that the invention is equally useful with engine sensors that produce thrust information in other than EPR form. For example, if thrust is controlled in terms of "low pressure" rotor speed, $N_1$, rather than EPR, the indicators will be $N_1$ indicators; and, the data processor program will be changed to use $N_1$, rather than EPR signals.)

The data processor 33 receives both data and commands from the CDU. In this regard, prior to takeoff, the pilot inserts certain data via the CDU. This data includes: outside air temperature (OAT); elevation of the destination airport (DELV); a reserve fuel value (RESRVS); the zero fuel weight of the aircraft (ZFW); and, a numerical cost index value (INDEX). The outside air temperature (OAT) is the runway temperature reported by the airport terminal information service. The temperature may be inserted in either degrees Celsius or degrees Fahrenheit. Entry of either value automatically initiates computation and display of the other value. The elevation of the destination airport (DELV) is the height of the runway at the destination airport. The reserve fuel value (RESRVS) is the fuel intended to be aboard upon arrival at the destination airport, in either pounds or kilograms. The zero fuel weight (ZFW) is the sum of the aircraft's operating weight empty and its payload, in either pounds or kilograms. The cost index number (INDEX) is a dimensionless number that represents the relationship of fuel costs to trip time costs as determined by the airline company.

Figure 2:
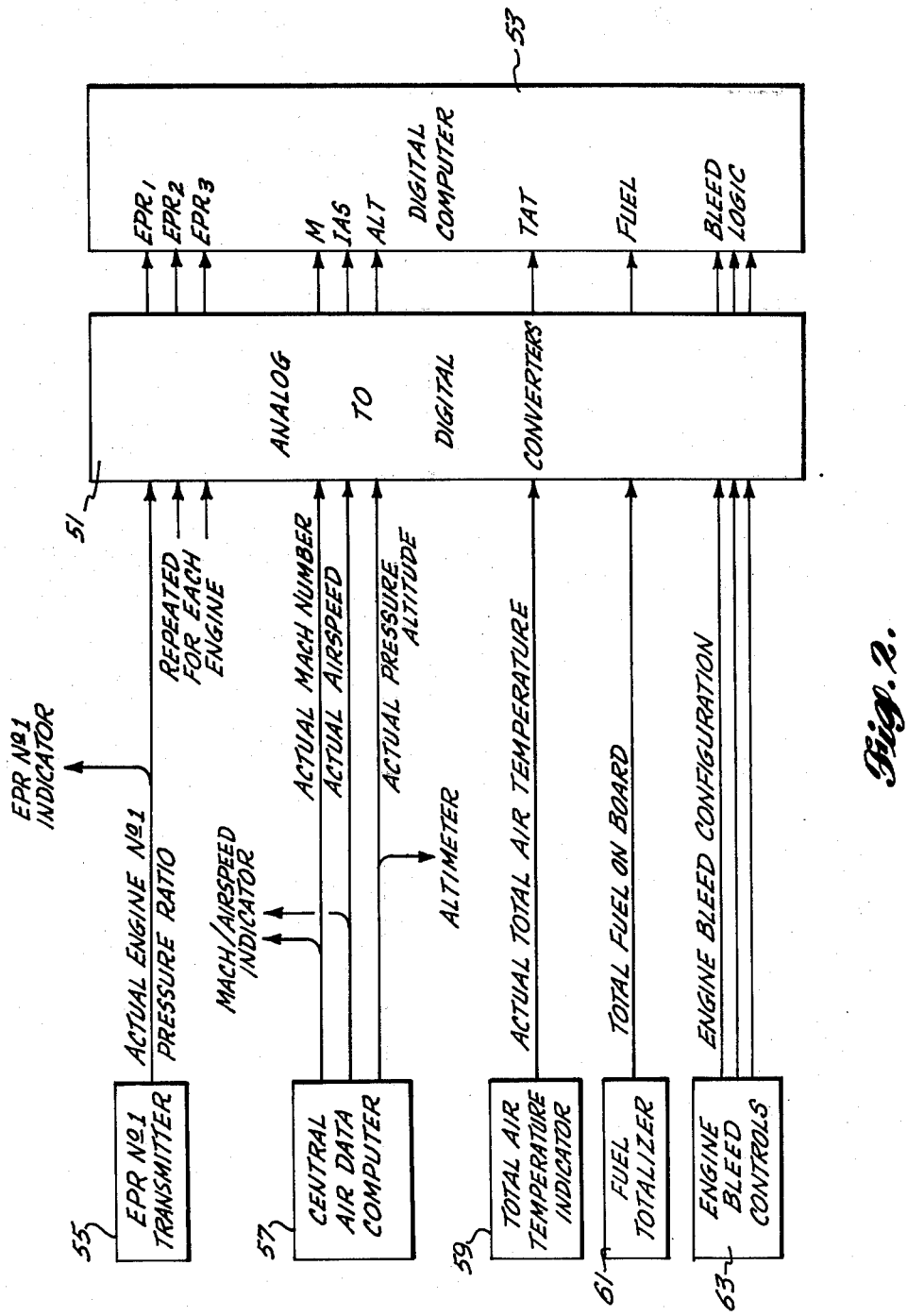
FIG. 2 is a block diagram of the portion of an avionic system formed in accordance with the invention for receiving and conditioning signals produced by other aircraft systems.

In addition to receiving pilot loaded data from the CDU, the data processor 33 also receives continuous inputs from other aircraft systems and sensors. These inputs are best illustrated in FIG. 2 and hereinafter described. In accordance with the data loaded by the pilot, the information received from other aircraft subsystems and sensors, and data stored in the data processor, the data processor produces signals that are adapted to control the position of bugs located around the periphery of the Mach/airspeed indicator 35 and the EPR indicators 37, 39 and 41. As used herein, the term "bugs" refers to servo driven pointers movable around the periphery of the indicators to which they relate. (Of course, if the instruments have displays other than circular displays as shown herein, the bugs may move along paths other than circular paths. For example, if the instruments have a linear display, the bugs will move longitudinally.)

As will be better understood from the following discussion, the bugs are driven to a position that denotes the most economical climb, cruise and descent airspeed and EPR values for the phase of the flight path being covered. The pilot controls the throttles of the aircraft such that the conventional pointers (e.g., needles) of the EPR indicators point toward the respective bug position. After the throttles are set so that the EPR needles point toward the EPR bugs, the pilot controls the pitch altitude of the aircraft, during climb and descent, so that the airspeed pointer or needle points toward the airspeed bug. When both the EPR and airspeed needles point toward their respective bugs, the aircraft is following the desired profile.

FIG. 2 is a block diagram of a part of the data processor and the other subsystems and sensors of the aircraft that provide information signals to the data processor. The part of the data processor illustrated in FIG. 2 comprises a set of analog to digital converters 51 and a digital computer 53. The other subsystems and sensors of the aircraft illustrated in FIG. 2 that send information signals to the data processor comprise: an EPR transmitter 55 for each engine, only one of which is illustrated in FIG. 2; the central air data computer 57 of the aircraft; the total air temperature indicator 59 of the aircraft; the fuel totalizer 61 of the aircraft; and, the engine bleed controls 63. Each EPR transmitter 55 produces a signal having a value related to the actual engine pressure ratio of a related engine. These signals, which are applied to a related EPR indicator to control the position of the needle of the related EPR indicator, are also applied to the digital computer 53 via suitable analog-to-digital converters forming part of the set of analog-to-digital converters 51. As a result, the digital computer receives, in the case of a three engine aircraft, three EPR signals denoted $EPR_1$, $EPR_2$ and $EPR_3$, each of which denotes the actual engine pressure ratio of the related engine.

The central air data computer 57, among other signals, produces an actual Mach number signal, an actual airspeed signal, and an actual pressure altitude signal. The Mach and airspeed signals, which are applied to the Mach/airspeed indicators to control the position of the needles and digital (Mach) display of the Mach/airspeed indicator are also applied to the digital computer 53 via suitable analog-to-digital converters, also forming part of the set of analog-to-digital converters 51. The actual pressure altitude signal, in addition to being applied to the altimeter, is also applied to the digital computer 53 via a suitable analog-to-digital converter forming a part of the set of analog-to-digital converters 51. In this way, the digital computer receives: a signal, denoted M, representing actual Mach number; a signal, denoted IAS (indicated airspeed), representing actual airspeed; and a signal, denoted ALT, representing actual altitude based on pressure. Preferably the M, IAS, ALT, as well as the EPR signals are each filtered by a two (2) second time constant filter either digitally after conversion or in an analog manner prior to conversion into digital form.

The total air temperature indicator 59 receives a signal from a total air temperature probe that represents actual total air temperature. This signal is routed from the indicator to the digital computer 53 via a suitable analog-to-digital converter also forming a part of the set of analog-to-digital converters 51. The signal received by the digital computer representing total air temperature is denoted TAT.

The fuel totalizer 61 produces a signal representing the total fuel onboard the aircraft. This signal is converted into digital form via an analog-to-digital converter forming a part of the set of analog-to-digital converters 51. The total fuel onboard signal is denoted FUEL. Preferably, at some point the FUEL signal is also filtered by a two (2) second time constant filter. The engine bleed controls 63 produce signals representing the bleed configuration of the engines. These signals are also converted into digital form by suitable analog-to-digital converters forming a part of the set of analog-to-digital converters 51. The converted signals are applied to the digital computer 53 and are denoted BLEED LOGIC.

Figure 3:
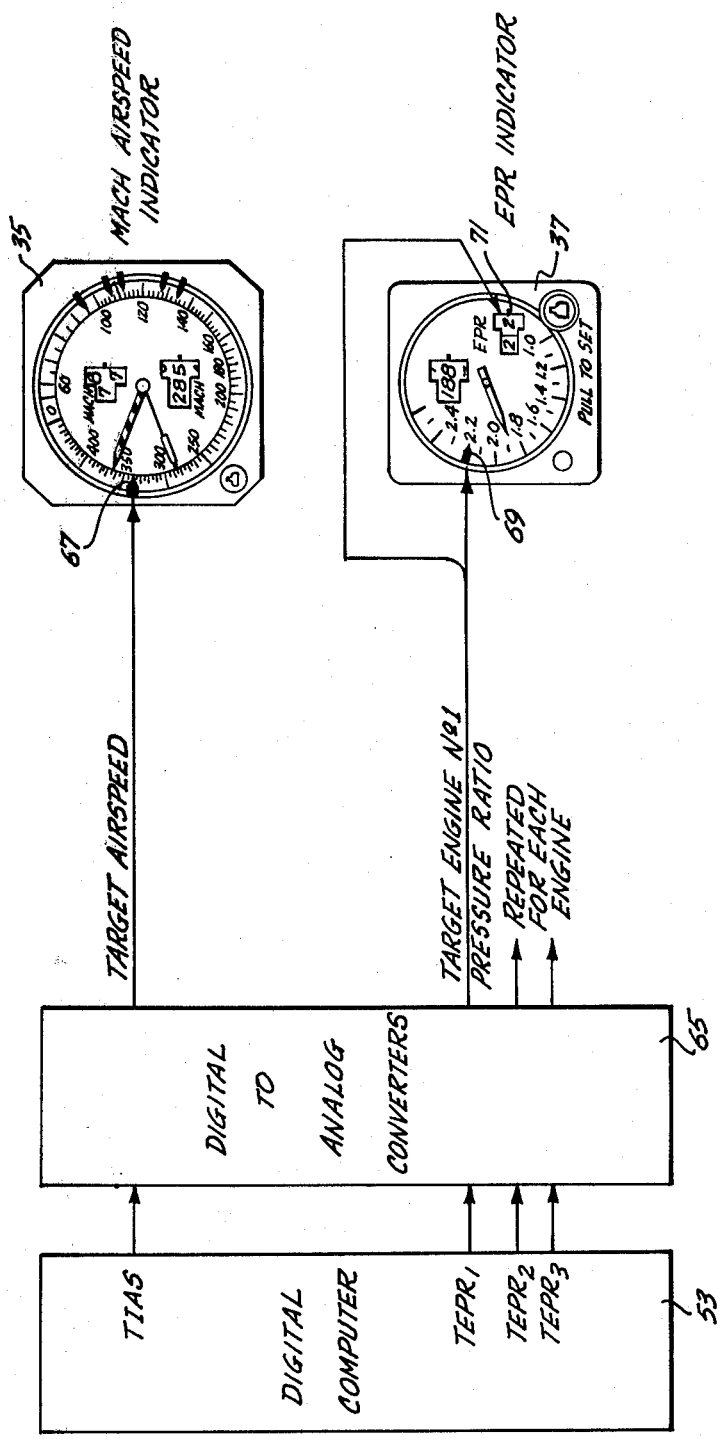
FIG. 3 is a partially block and partially pictorial diagram of the portion of an avionic system formed in accordance with the invention for producing signals adapted to control bugs of a Mach/airspeed indicator and EPR indicators.

FIG. 3 is a partially block and partially pictorial diagram illustrating a part of the data processor and the signals produced by the data processor for controlling the position of the bugs on the Mach/airspeed indicator 35 and a representative one of the EPR indicators 37. In addition to the digital computer 53, the part of the data processor illustrated in FIG. 3 also includes a set of digital-to-analog converters 65.

The digital computer 53 produces four bug control signals. The first signal is a target airspeed signal, denoted TIAS (target indicated airspeed) in the following description. The other three signals are target engine pressure ratio signals, denoted $TEPR_1$, $TEPR_2$, and $TEPR_3$. The subscripts of the target engine pressure ratio signals denote the related engine.

TIAS, $TEPR_1$, $TEPR_2$ and $TEPR_3$ are each applied to a digital-to-analog converter forming a part of the set of digital-to-analog converters 65. The resultant analog signals are applied to the related instrument. More specifically, the analog target airspeed signal is applied to the Mach/airspeed indicator 35 so as to control the position of the bug 67 of the Mach/airspeed indicator.

The target engine pressure ratio signals are applied to the related EPR indicators. For example, the target engine pressure ratio signal for engine number one (No. 1) is applied to the illustrated EPR indicator 37 so as to control the position of the bug 69 of that indicator. In addition to the bug, the EPR indicator may include a digital display 71, located in a window in the face of the EPR indicator, that provides a digital indication of target EPR. If the instrument includes a digital display, of course, the target engine pressure ratio signal not only controls the position of the bug 69, it also controls the digital display 71. Both the Mach/airspeed indicator and the EPR indicators may include digital displays of needle position, if desired, as hereinafter desribed with respect to FIGS. 4A and 4B.

Figure 4A:
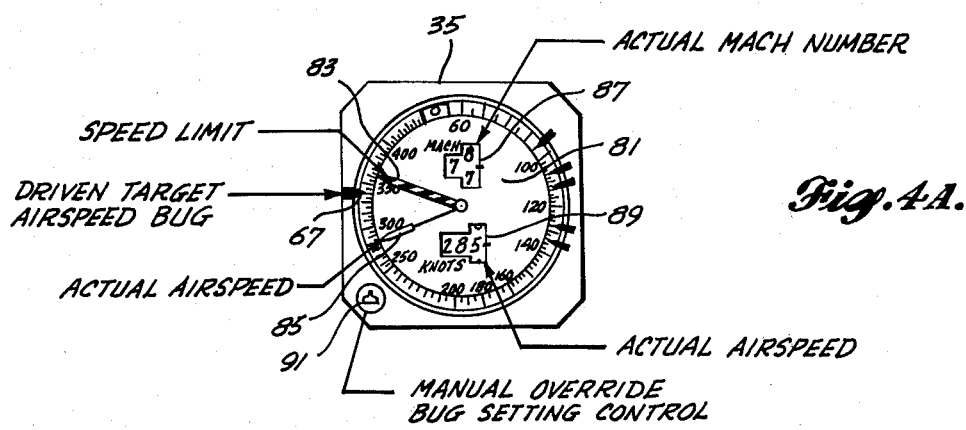
FIG. 4A is a pictorial diagram of the face of a Mach/airspeed indicator suitable for use in the preferred embodiment of the invention.

FIG. 4A is a pictorial diagram illustrating the face of a Mach/airspeed indicator suitable for use with the preferred embodiment of the invention. The illustrated Mach/airspeed indicator includes a circular dial 81 having a scale, graduated in terms of airspeed, located about its outer periphery. A position adjustable speed limit needle 83 and an actual airspeed needle 85 have their axes of rotation located at the center of the dial and coact with the peripheral graduations. The position of the speed limit needle 83 is controlled by means not forming a portion of this invention to indicate the speed limit for the aircraft based on aircraft altitude and/or other factors. The actual airspeed needle 85 points to the actual airspeed of the aircraft. The driven target bug 67, as previously noted, is servo driven and formed so as to be movable about the outer periphery of the dial 81. The driven target bug "points" toward the TIAS value.

In addition to the dial displays, the Mach/airspeed indicator includes two digital displays that are viewable through apertures in the dial 81. The first digital display is an actual Mach number display 87. The second digital display is an actual airspeed display 89. In addition to the displays, the Mach/airspeed indicator includes a control knob 91. When the control knob is pulled out, it can be rotated to manually adjust the position of the driven target airspeed bug 67. The manual rotation of the control knob 91 overrides the TIAS signal produced by the digital computer.

Figure 4B:
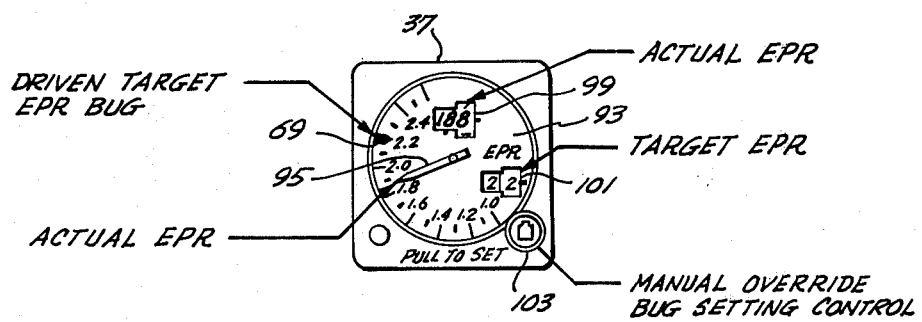
FIG. 4B is a pictorial diagram of the face of an EPR indicator suitable for use in the preferred embodiment of the invention.

FIG. 4B is a pictorial diagram of the face of an EPR indicator suitable for use with the preferred embodiment of the invention. The EPR indicator 37 illustrated in FIG. 4B includes a circular dial 93 and a needle 95. The axis of rotation of the needle is located at the center of the dial and the needle coacts with EPR graduations located about the periphery of the dial 93. The needle position is controlled by the actual EPR of the engine related to the EPR indicator. Movable around the outer periphery of the dial 93 is the target EPR bug 97. As previously discussed, the EPR bug position is controlled by a suitable servo system controlled by the target EPR signal produced by the digital computer and, thus, points toward the TEPR value. In addition to the dial display, the EPR indicator illustrated in FIG. 4B also includes two digital displays. The first digital display is an actual EPR display 99. That is, this digital display displays, in digital form, the EPR value pointed to by the needle 95. The second digital display is a target EPR digital display 101. Target EPR digital display displays, in digital form, the position of the driven target EPR bug 69. Finally, the EPR indicator 37 includes a knob 103. When the knob is pulled out and rotated, it controls the position of the driven target EPR bug 69. The knob provides a manual override that allows the bug (and the target EPR digital display) to be set to a desired position different than the position the bug (and target EPR digital display) would be set to by the target EPR signal produced by the digital computer.

Figure 4C:
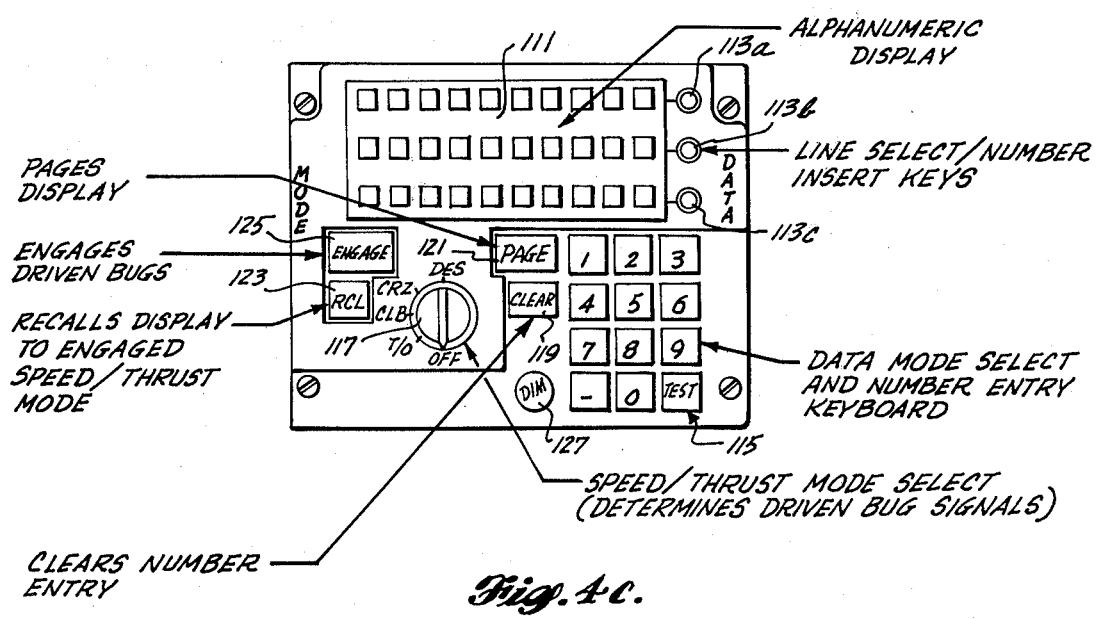
FIG. 4C is a pictorial diagram of the face of a control display unit (CDU) suitable for use in the preferred embodiment of the invention.

FIG. 4C is a pictorial diagram of the face of the CDU. Prior to describing the display and interface aspects of the CDU, it is pointed out that, preferably, an economy performance data avionic system formed in accordance with the invention is integrated with a system adapted to perform additional functions. For example, an overall system, of which the present invention forms a part, may also function as a trip planning device that provides information of interest to the pilot, such as ground speed, time to arrival, etc. As a result, the CDU is adapted to have different modes of operation. In order to avoid unduly complicating the description of the preferred embodiment of the present invention, only the portion of the CDU directly related to the present invention is illustrated and described in detail. With this limitation in mind, the pictorial diagram of the CDU illustrated in FIG. 4C includes: a three-line alphanumeric display 111; three line select/number insert keys 113a, 113b and 113c, one for each line of the alphanumeric display; a data mode select and number entry keyboard 115; a speed/thrust mode select switch 117; a clear (CLEAR) button 119; a page (PAGE) button 121; a recall (RCL) button 123; an engage (ENGAGE) button 125; and, a dim control knob 127.

The alphanumeric display 111 displays a variety of data, as will be better understood from the following discussion. The line select/number insert keys are used to select which line is to receive data when data is loaded by the pilot. The line select/number insert keys also control the entry of pilot loaded data into storage in the data processor. More specifically, normally the line select/number insert keys are off, i.e., unlit. When data is to be loaded (or stored data is to be changed), the key adjacent to the appropriate data line is pressed to identify the line and advise the data processor that data (or new data) is to be forthcoming. This key now flashes on and off. Next the pilot enters the data via the data mode select and number entry keyboard (hereinafter described in more detail). Next, the flashing key is again pressed. If the data is accepted by the data processor, the flashing stops. (In addition, the display may blink, if desired.) If the data is not accepted by the data processor, the key continues flashing.

The data mode select and number entry keyboard 115 includes a conventional 3 by 4 array of keys, ten of which are identified by the digits 0-9. The other two keys are identified as minus (−) and TEST keys.

The speed/thrust mode select switch 117 is a five position rotary switch. The five positions are identified as: OFF; T/O (takeoff); CLB (climb); CRZ (cruise); and, DES (descent). The CLEAR button 119, when actuated, clears data from a line selected by one of the line select/number insert keys. When actuated, the PAGE button 121 pages the display. More specifically because of the line limitation on the alphanumeric display (three in the illustrated embodiment), it is necessary to have several "pages" of information in some instances in order to display all of the necessary information. Each time the PAGE button is actuated, the display shifts to the next page in the sequence. When the last page is reached, actuation of the PAGE button causes the first page of the sequence to reappear.

The RCL button 123 recalls the display to the engaged speed/thrust mode of operation. For example, if the engaged speed/thrust mode of operation is climb; and, the pilot was looking at the cruise display, actuation of the RCL button will cause the climb display to reappear. The ENGAGE button 125 causes the data displayed on the alphanumeric display 111 to be used to drive the bugs of the Mach/airspeed and EPR indicators to the displayed values. That is, an alphanumeric display is first created by switching the speed/thrust mode select switch to the desired position. The displayed information, however, does not immediately control the position of the bugs. This action only takes place when the ENGAGE button 125 is thereafter pressed. Preferably, a lamp cooperates with the ENGAGE button 125 such that the ENGAGE button is lit when the information being displayed on the alphanumeric display 111 is different than that being used to control the position of the bugs.

While the alphanumeric display 111 is illustrated as a three row display formed of individual incandescent alphanumeric display elements, it will be appreciated that other types of displays can be utilized. For example, the display could be a cathode ray tube (CRT) display. Further, the display can include more than three lines, if desired. Moreover, an arrangement can be implemented wherein a particular symbol is used to depict which line of data will be changed. For example, a caret (<) can be formed so as to be movable in the right-hand column of the overall display. The position of the caret indicates which line data will be changed, if a change is to be made. The caret, of course, is movable to lines containing data that can be changed through an index arrangement, i.e., each time an index button is depressed, the caret moves to the next line of data that can be changed.

Figure 5:
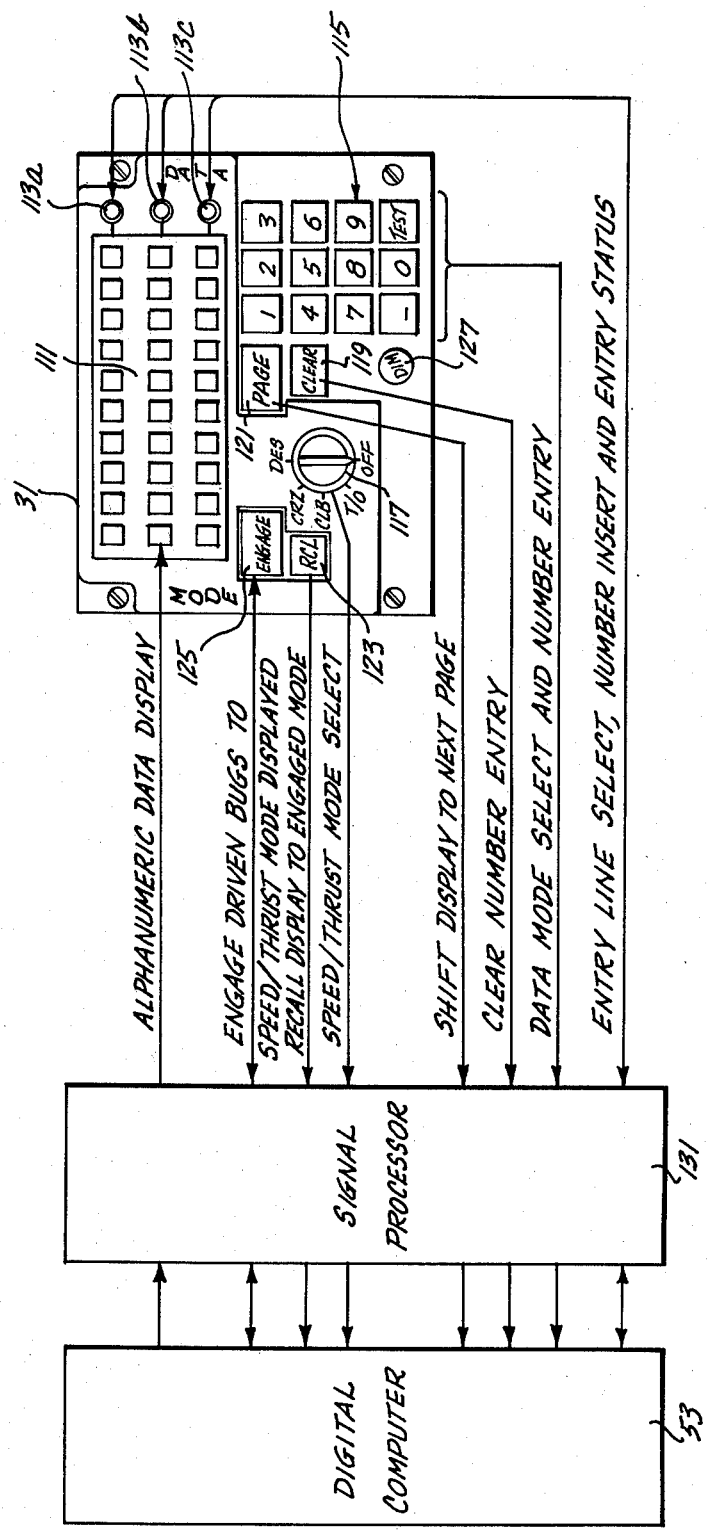
FIG. 5 is a partially block and partially pictorial diagram illustrating the flow of information between the CDU and a data processor, both of which form portions of an avionic system formed in accordance with the invention.

FIG. 5 is a partially block and partially pictorial diagram that illustrates the flow of signals between the CDU 31 and the data processor. In addition to the CDU 31 and digital computer 53, FIG. 5 includes a signal processor 131, which also forms part of the data processor. The signal processor is an interface unit that: (1) receives signals from the CDU and converts them into a form suitable for receipt by the digital computer 53; and (2) receives signals from the digital computer 153 and converts them into a form suitable for application to the CDU 31. More specifically, the signal processor receives alphanumeric data display control signals from the digital computer, decodes these signals and, in accordance therewith, causes the appropriate characters to be displayed in the appropriate positions of the alphanumeric display. Further, the signal processor receives a suitable signal when one of the line select/number insert keys 113a, 113b and 113c is actuated. In accordance therewith, the signal processor applies a signal to the digital computer 53 that indicates which line of the alphanumeric display 111 is to have its data changed. The digital computer, in accordance therewith, enables the required area of a memory to receive the data, after it is verified to be within any preset limits.

The signal processor also detects when the data mode select and number entry keyboard keys are actuated, e.g., depressed. The signal processor, in accordance therewith, produces an encoded output that informs the digital computer of the nature of the key that was depressed and, thus, the nature of the data being entered, or the readout being requested (e.g., FUEL, TEST). Further, the signal processor detects the position of the speed/thrust mode select switch 117 and produces an encoded signal that advises the digital computer 53 of the position of the speed/thrust mode select switch 117. Finally, CLEAR PAGE, RCL and ENGAGE button actuations are sensed by the signal processor. When any of these buttons are actuated, the signal processor produces an encoded output signal that advises the digital computer 53 of the actuation. And, the data computer produces a signal that controls the igniting of the lamp associated with the ENGAGE button 125, via the signal processor.

Figure 6A:
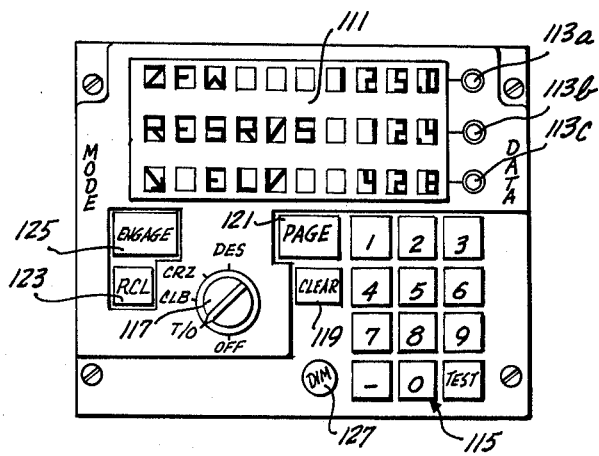
FIG. 6A is a pictorial diagram of the face of the CDU illustrating the display that occurs when certain data is being loaded.
Figure 6B:
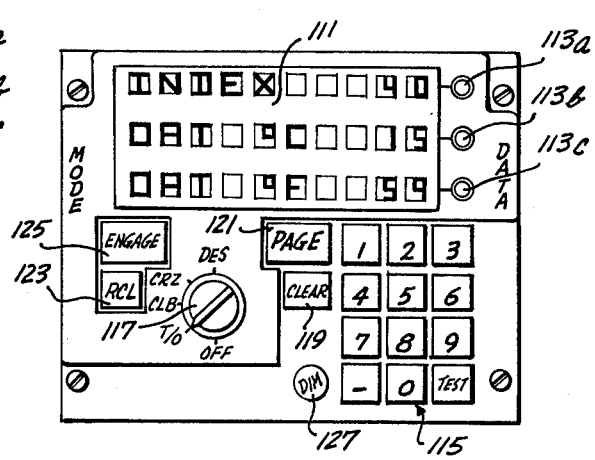
FIG. 6B is a pictorial diagram of the face of the CDU illustrating the display that occurs when other data is loaded.

FIGS. 6A and 6B illustrate examples of alphanumeric displays that occur when the pilot enters data prior to takeoff. FIG. 6A illustrates the first "page" of data; and, FIG. 6B illustrates the second "page" of data. Normally when data is entered prior to takeoff, the speed/thrust mode select switch 117 is in the takeoff (T/O) position. If the first "page" is not displayed, the PAGE button 121 is depressed so that the first page is displayed. In the illustrated embodiment of the invention, the first page of the preflight display includes: a zero fuel weight (ZFW) display; a reserve fuel (RESRVS) display; and a destination elevation (DELV) display pictorially identified by the notation ELV. The ZFW display is on the first line; the RESRVS display is on the second line; and, the DELV display is on the third line.

When ZFW data is to be entered, the pilot actuates the line select/number insert key 113a adjacent to the first line. The pilot then depresses the CLEAR button 119, which clears any existing ZFW data from the display and from the memory of the data processor. Thereafter, the pilot inserts or loads the appropriate ZFW data by pressing, in the appropriate sequence, the related digit keys of the data mode select and number entry keyboard 115. Any necessary decimal point automatically appears at the appropriate position. After the ZFW data has been entered, the pilot visually checks the data for correctness. Thereafter, the now flashing line select/number insert key 113a is again pressed, whereby the displayed ZFW data is automatically shifted into the memory of the data processor. After the ZFW data is loaded, the RESRVS data and, then, the DELV (or ELV) data are loaded using the same sequence of steps.

After the data in all of the lines of the first page have been loaded, the PAGE button is pressed. As a result, the second page (FIG. 6B) is displayed. The first line of second page of the preflight data display is the flight INDEX number. The second and third lines display the outside air temperature (OAT) in degrees centigrade (second line) and in degrees Farenheit (third line). Preferably, the insertion of OAT in either form of temperature units automatically causes the other form to be displayed. That is, if OAT is inserted in degrees Celsius, it is automatically displayed in degrees Farenheit also, and vice versa. If desired, a third page could also be provided. Data entered on the third page could include: the crossing altitude of a navigation beacon (ELV); headwind (or tailwind) information; and, air traffic controller (ATC) restrictions, for examples. Some of this information, of course, such as ELV and ATC restrictions are entered during a flight, when they become available.

Figure 7A:
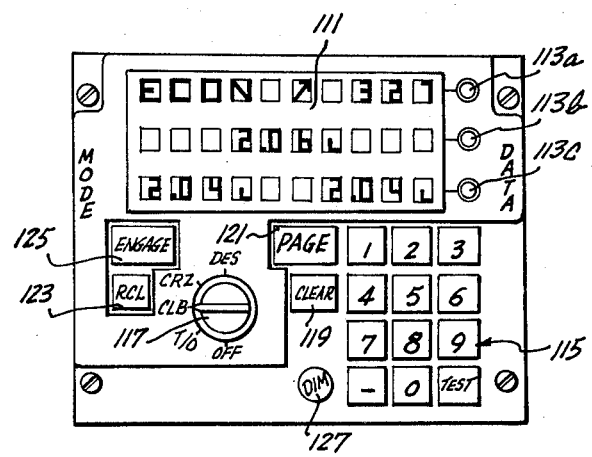
FIG. 7A is a pictorial diagram of the face of the CDU illustrating the display that occurs during the climb mode of operation.
Figure 7B:
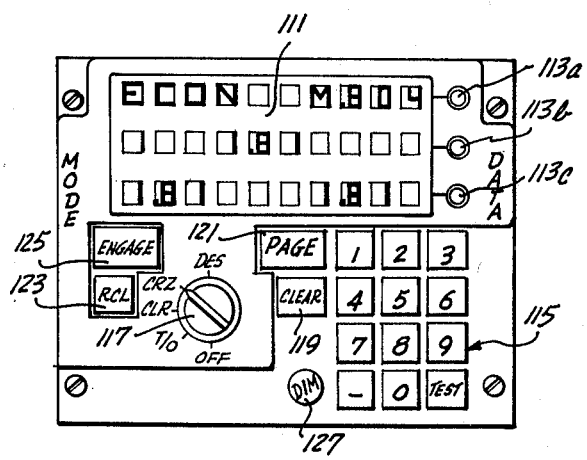
FIG. 7B is a pictorial diagram of the face of the CDU illustrating the display that occurs during the cruise mode of operation.

FIGS. 7A, B, and C are illustrative examples of CDU displays for certain operative modes of the invention. More specifically, FIG. 7A illustrates an exemplary climb mode display; FIG. 7B illustrates an exemplary cruise mode display; and, FIG. 7C illustrates an exemplary descent mode display.

The first line of the climb mode display illustrated in FIG. 7A reads ECON ↗ 327. The acronym ECON, indicates that the display is an economy display; the ↗ indicates that the display is a climb mode display; and, 327 is the target indicated airspeed (in knots per hour) for the economy climb mode. The second line of the climb mode display illustrated in FIG. 7A reads 2.06L; and, the third line of the climb mode display reads 2.04L 2.04L. The 2.06 and 2.04 displays are the target EPR values for the three engines; and, the suffix L indicates that the values are limit values. The engine related to the second line display has a slightly higher EPR setting than the other engines, because it has a higher limit. This engine could be the center or tail engine of a Boeing 727 aircraft, for example.

The first line of the cruise mode display illustrated in FIG. 7B reads ECON M.804. The acronym ECON indicates that the display is an economy mode display; the absence of an arrow indicates that the display is a cruise display; and M.804 is the target Mach number. The second line of the cruise mode display reads 1.81; and, the third line reads 1.81 1.81. The 1.81 readings are the target EPR values for a cruise speed of Mach 0.804.

Figure 7C:
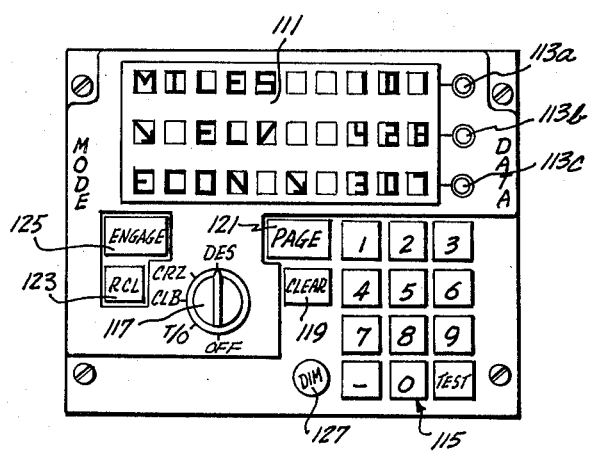
FIG. 7C is a pictorial diagram of the face of the CDU illustrating the display during the descent mode of operation.

The first line of the descent mode display illustrated in FIG. 7C reads MILES 101. This display indicates that the aircraft should be one hundred and one (101) miles from the destination airport. The second line of the descent mode display reads ↘ ELV 428, which means that the elevation of the destination airport (DELV) is 428 feet above sea level. The last line of the descent mode display reads ECON ↘ 307. ECON indicates that the display is an economy mode display; ↘ indicates that the display is a descent display; and, 307 is the target indicated airspeed (in knots). Of course, as in most conventional descents, the throttles during descent are set at an idle thrust position. Control of the attitude of the aircraft, of course, controls the descent speed so that the desired descent profile is followed.

Prior to describing the operation of the data processor in detail, it is pointed out that the memory of the data processor stores data other than that loaded by the pilot. Included is the temporary storage of data received from the other aircraft systems and sensors illustrated in FIG. 2 and previously described. More importantly, the memory of the data processor stores several tables of data that are hereinafter described. The tables, in many cases, contain data that is unique to the type of aircraft with which the invention is being used, e.g., Boeing Model 727 or 737 aircraft. The data contained in these tables is ether derived experimentally or calculated, as appropriate. Other tables contain relatively standard information. Regardless of how the tabulated data is derived, the data processor causes model data to be "looked up" in the tables, based on loaded information (e.g., INDEX value); information obtained from other aircraft systems or sensors (e.g., an altitude value); or, calculated information. In order for the nature of these tables to be more readily understood, they are shown in graphical form in the drawings illustrating the operation of the digital processor.

Figure 8A:
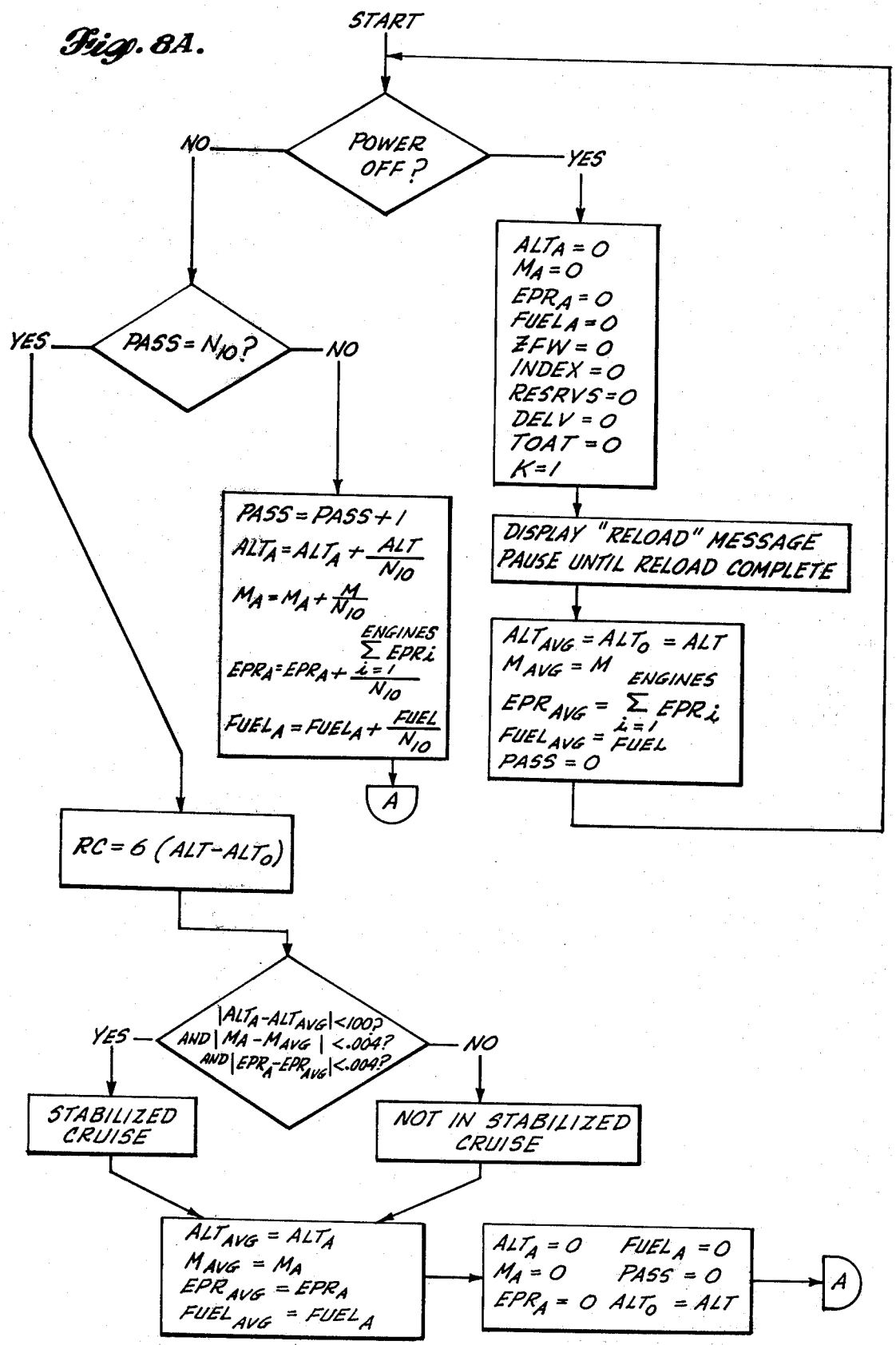
FIGS. 8A and 8B form a composite flow diagram illustrating the data conditioning subroutine of the data processor.
Figure 8B:
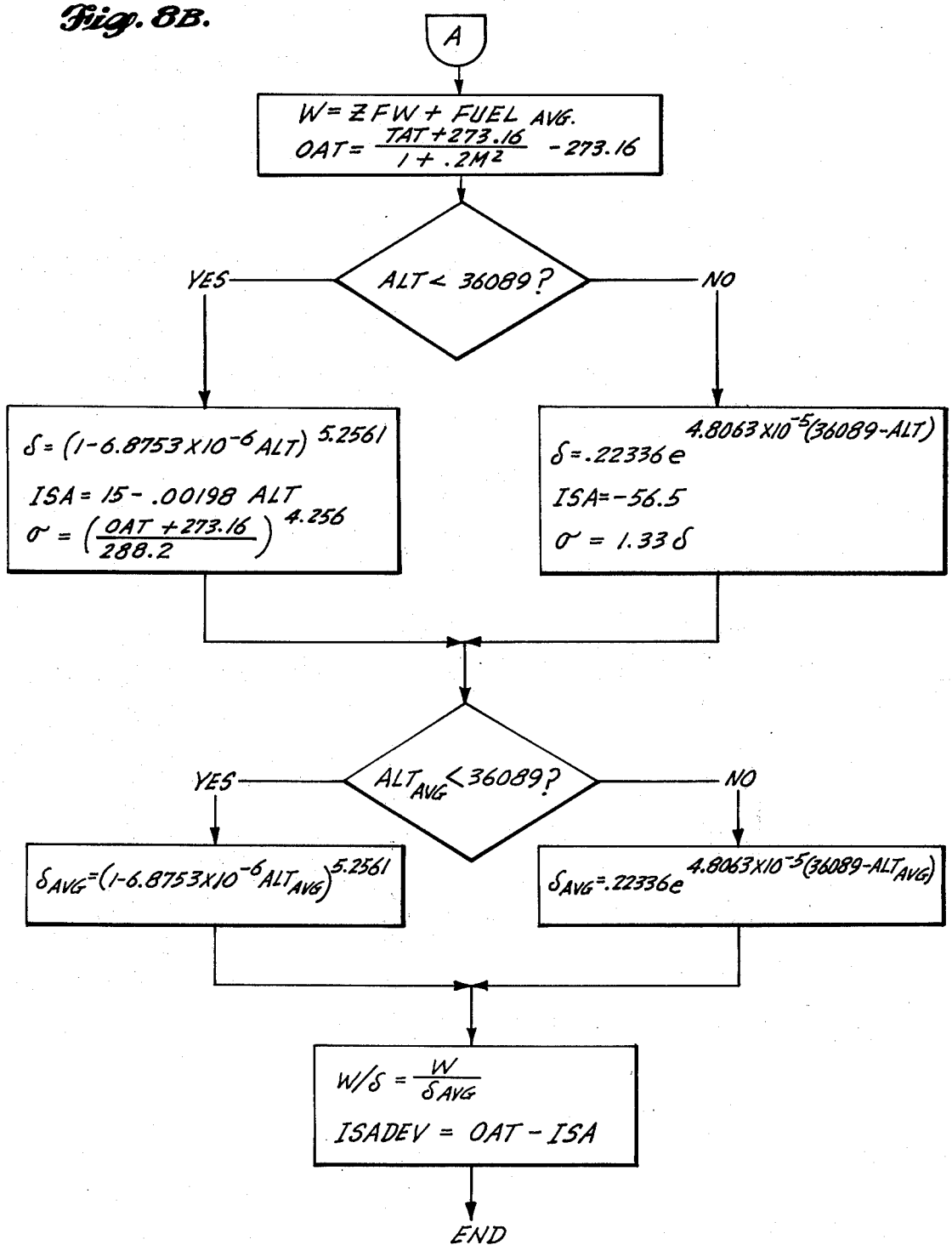

Turning now to a discussion of the operation of the data processor; FIGS. 8A and 8B are flow diagrams illustrating a data conditioning subroutine. Prior to the data processor beginning the calculations associated with one of its functional modes of operation (i.e., climb, cruise or descent), the data processor circulates through the illustrated data conditioning subroutine. When any of the data processor functional modes is actuated, the data processor cycles through a data conditioning subroutine prior to each cycle through the related functional mode subroutine.

First, the data conditioning subroutine performs a test to determine whether or not power was previously off. If power was previously off, an initialization loop (illustrated on the right side of FIG. 8A) is followed. The first step of the initialization loop is to zero certain values. These values include: an intermediate altitude value ($ALT_A$); an intermediate Mach value ($M_A$); an intermediate engine pressure ratio value ($EPR_A$); and, an intermediate fuel value ($FUEL_A$). In addition, data that is required to be loaded into the data processor via the CDU, as previously described, is zeroed. This data includes the ZFW, INDEX, RESRVS, DELV (or ELV) and OAT data. (OAT is represented by TOAT in FIG. 8A, which represents takeoff outside air temperature to distinguish this temperature from calculated values of OAT hereinafter described.) In addition, a self-correction factor, K, is set equal to one. After the foregoing data is zeroed, the CDU is controlled to display a RELOAD message. The processing of data through the loop is now temporarily halted until the required data (ZFW, INDEX, RESRVS, DELV and OAT) is loaded by the pilot.

As will be better understood from the following description, the invention includes an averaging technique wherein data received from the central air data computer, the EPR transmitters and the fuel totalizer is averaged over a predetermined number of computer passes. After the predetermined number of computer passes has been completed, the average data is stored. During the next predetermined number of computer "passes" a new set of averaged data is calculated. Then, the stored averaged data is replaced by the new averaged data. The predetermined number of passes is, in the embodiment of the invention illustrated in FIG. 8A, equal to the number of computer passes occurring in ten seconds ($N_{10}$). Thus, the averaged values are the average data readings over ten seconds. The number of passes, of course, may be substantial during the ten second period, i.e., several thousand. And, values other than ten seconds can be used, of course. In order to accomplish this procedure, it is necesssary to initialize certain values when power is first turned on. This is the next step in the initialization loop.

More specifically, after the required data has been loaded by the pilot, additional initialization steps take place. During the additional initialization steps, an average altitude value ($ALT_{AVG}$) and a zero pass altitude value ($ALT_0$) are both set to the altitude value (ALT) presently transmitted by the central air data computer 57, illustrated in FIG. 2. In addition, an average Mach value ($M_{AVG}$) is set equal to the Mach (M) value also being received from the central air data computer. Further, an average EPR value ($EPR_{AVG}$) is set equal to the sum of the engine EPR values being received from the EPR transmitters 55. Next, an average fuel value ($FUEL_{AVG}$) is set equal to the value of the fuel signal (FUEL) obtained from the fuel totalizer. Finally, a control signal denoted "PASS" is set equal to zero. After these steps have taken place, initialization is complete and the data conditioning subroutine cycles back to the power off test step. Of course, the initialization values are all stored in suitable memory bins for use as hereinafter described.

After the steps of the initialization loop have been traversed, the power off test determines that power was previously on, whereby the data conditioning subroutine shifts to the data averaging steps of the data conditioning subroutine. The data averaging steps of the data conditioning subroutine are illustrated on the left side of FIG. 8A. The first step of the data averaging steps is a test to determine whether or not PASS is equal to $N_{10}$. In other words, is the present PASS the $N_{10}$th PASS.

Assuming the present PASS is not the $N_{10}$th PASS, the PASS value is updated by one. Next, the stored $ALT_A$ value is updated. $ALT_A$ (new) is equal to $ALT_A$ (stored) plus $ALT/N_{10}$. (ALT, as noted above, is equal to the altitude value received from the central air data computer at the time a particular calculation is made, or some stored altitude value is being updated.) The stored $ALT_A$ value is then replaced by the new $ALT_A$ value. As a result, $ALT_A$ (new) is incremented by a $N_{10}$th fractional value of ALT during this, and each following, PASS prior to the $N_{10}$th PASS. Similarly, the stored Mach value ($M_A$) is updated using the equation $M_A$ (new) equals $M_A$ (stored) plus $M/N_{10}$, where M is equal to the Mach value received from the central air data computer at the time this calculation is made. The stored $EPR_A$ value is updated in the same way using the formula $EPR_A$ (new) equals $EPR_A$ (stored) plus a summation of EPR values received from the EPR transmitters for the number of engines, divided by $N_{10}$. Finally, the stored fuel value ($FUEL_A$) is updated using the formula $FUEL_A$ (new) equals $FUEL_A$ (stored) plus FUEL divided by $N_{10}$, where FUEL is the value received from the fuel totalizer.

After the new $ALT_A$, $M_A$, $EPR_A$ and $FUEL_A$ values have been determined and stored (point A of FIG. 8A), the data conditioning subroutine proceeds through a series of steps that determine other values illustrated in FIG. 8B (starting at point A of FIG. 8B). Prior to describing the steps illustrated in FIG. 8B, the steps that occur during the $N_{10}$th pass are described. Specifically, when the pass test determines that PASS equals $N_{10}$, the data conditioning subroutine shifts from the $ALT_A$, $M_A$, $EPR_A$ and $FUEL_A$ updating path to an average value updating path (illustrated in the lower left of FIG. 8A). The first step in the average value updating path is to calculate the aircraft's rate of climb (RC), if any. RC is determined by subtracting the stored value of $ALT_0$ from the present altitude value (ALT) and multiplying the result by the number six (6).

The next step is to determine whether or not the aircraft is or is not in a stabilized cruise mode of operation. This determination is made by certain subtraction and comparison steps hereinafter described. First, the stored value of $ALT_A$ (determined during the $N_{10}$-PASS) is subtracted from the stored value of $ALT_{AVG}$ and a determination is made as to whether or not the absolute value of the difference is less than 100. Next, the stored value of $M_A$ (determined during the $N_{10}$-1 PASS) is subtracted from the stored value of $M_{AVG}$ and a determination is made as to whether or not the absolute value of the difference is less than 0.004. Finally, the stored value of $EPR_A$ (determined during the $N_{10}$-1 PASS) is subtracted from the stored value of $EPR_{AVG}$ and a determination is made as to whether or not the absolute value of the difference is less than 0.004. If all of these differences are less than the denoted values (i.e., 100, 0.004 and 0.004) an indicator or flag is set to indicate that aircraft is in a stabilized cruise mode of operation. If any of the differences are greater than the denoted value, the aircraft is considered to be in an unstabilized cruise mode of operation, and the indicator or flag is not set. (Setting the indicator or flag allows the data processor to update the self-correction factor K while the aircraft is in a stabilized cruise mode, as will be described later.)

Regardless of whether or not the aircraft is stabilized, after the stabilization test is performed, the stored average values are replaced by the $ALT_A$, $M_A$, $EPR_A$ and $FUEL_A$ values determined during the PASS immediately prior to the $N_{10}$ PASS. That is, the stored $ALT_{AVG}$ value is replaced by $ALT_A$ ($N_{10}$-1 PASS); the stored $M_{AVG}$ value is replaced by the $M_A$ ($N_{10}$-1 PASS); the stored $EPR_{AVG}$ value is replaced by $EPR_A$ ($N_{10}$-1 PASS); and, the stored $FUEL_{AVG}$ value is replaced by $FUEL_A$ ($N_{10}$-1 PASS). Subsequent to the updating of the "average" values, the "A" values are initialized to zero. That is, $ALT_A$, $M_A$, $EPR_A$ and $FUEL_A$ are all set to zero. In addition, PASS is set equal to zero. Finally, $ALT_0$ is set equal to the present altitude value (ALT) being received from the central air data computer. All of these values are, of course, stored in suitable memory bins and are used during the next set of passes through the "A" value incrementing path. After the "A" values and PASS have been set equal to zero, the data conditioning subroutine proceeds to the steps (point A) illustrated in FIG. 8B which are next described.

The first step of the part of the data conditioning subroutine illustrated in FIG. 8B is to determine a gross aircraft weight value (W) by adding the zero fuel weight (ZFW) to the stored value of $FUEL_{AVG}$. Next, the outside air temperature (OAT) is determined, based on the total air temperature (TAT) data received from the total air temperature indicator 59 (FIG. 2) and the Mach value (M) data received from the central air data computer. This determination is made using the equation:

$$OAT = \frac{TAT + 273.16}{1 + .2M^2} - 273.16 \quad (1)$$

After the values of W and OAT have been determined, a test is made to determine whether or not the present altitude (ALT) is above or below 36,089 feet. (As will be readily recognized by those familiar with air transportation, 36,089 is the International Standard Atmosphere [ISA] tropopause altitude.) Depending upon whether or not ALT is greater or less than 36,089, values of the atmospheric parameters δ, ISA and σ are determined.

If ALT is greater than 36,089 feet, δ is determined by the equation:

$$\delta = 0.22336 e4.8063 \times 10^{-5}(36089 - ALT) \quad (2)$$

ISA is set equal to −56.5 and σ is determined by multiplying δ by 1.33.

If ALT is less 36,089 feet, δ is determined by the equation:

$$\delta = (1 - 6.8753 \times 10^{-6} ALT)^{5.2561} \quad (3)$$

The value of ISA is determined by multiplying ALT by 0.00198 and subtracting the result from 15. The value of σ is determined by the equation:

$$\sigma = \left(\frac{OAT + 273.16}{288.2}\right) 4.256 \quad (4)$$

Subsequent to the foregoing steps being performed, a test is made to determine whether or not $ALT_{AVG}$ is greater or less than 36,089 feet. Depending upon the results of this test, the value of a term denoted $\delta_{AVG}$ is determined in one of two different manners. Specifically, if $ALT_{AVG}$ is greater than 36,089 feet, $\delta_{AVG}$ is determined in accordance with equation (2) using $ALT_{AVG}$ rather than ALT. If $ALT_{AVG}$ is less than 36,089 feet, $\delta_{AVG}$ is determined in accordance with equation (3), substituting $ALT_{AVG}$ for ALT.

Subsequent to determining the value of $\delta_{AVG}$, the value of a generalized weight parameter denoted W/δ is determined by dividing the value of W by $\delta_{AVG}$. In addition, an ISA deviation value (ISADEV) is determined by subtracting the value of ISA from the value of OAT. At this point, the data conditioning subroutine is complete and the data processor shifts to the appropriate one of the climb, cruise or descent mode subroutines illustrated in FIGS. 9–13 and hereinafter described, if one of these modes is selected by the speed/thrust mode select switch 117. If the speed/thrust mode select switch 117 is in the T/O position, the data processor shifts to a subroutine (not relevant to this invention) which calculates appropriate takeoff target EPR's. Of course, the calculated values of W, OAT, δ, ISA, σ, $\delta_{AVG}$, W/δ and ISADEV are stored for use as needed.

In summary, the data conditioning subroutine averages the data received from other aircraft systems and sensors over a predetermined time period. In addition, calculations of the value of certain terms are made. These terms are used in one or more of the climb, cruise and descent subroutines, hereinafter described. As previously noted, unless power is lost, the data processor continuously cycles through one or the other of the data conditioning paths, which depend upon whether $N_{10}$=PASS or $N_{10} \neq$ PASS. Following each pass through either of these data conditioning paths, the data processor cycles through the appropriate takeoff, climb, cruise or descent mode subroutine.

Figure 9A:
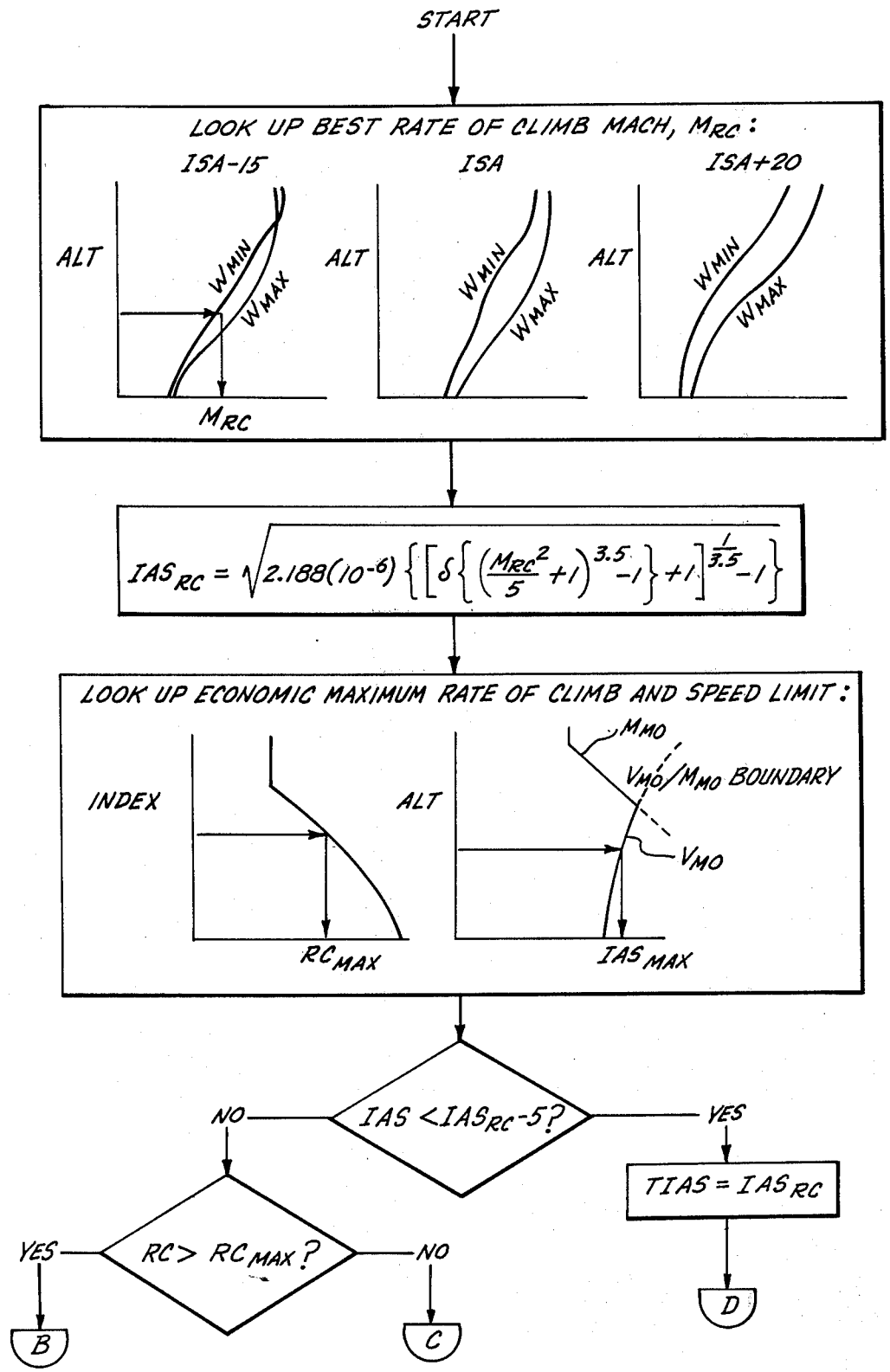
FIGS. 9A and 9B form a composite flow diagram illustrating the climb mode subroutine of the data processor.
Figure 9B:
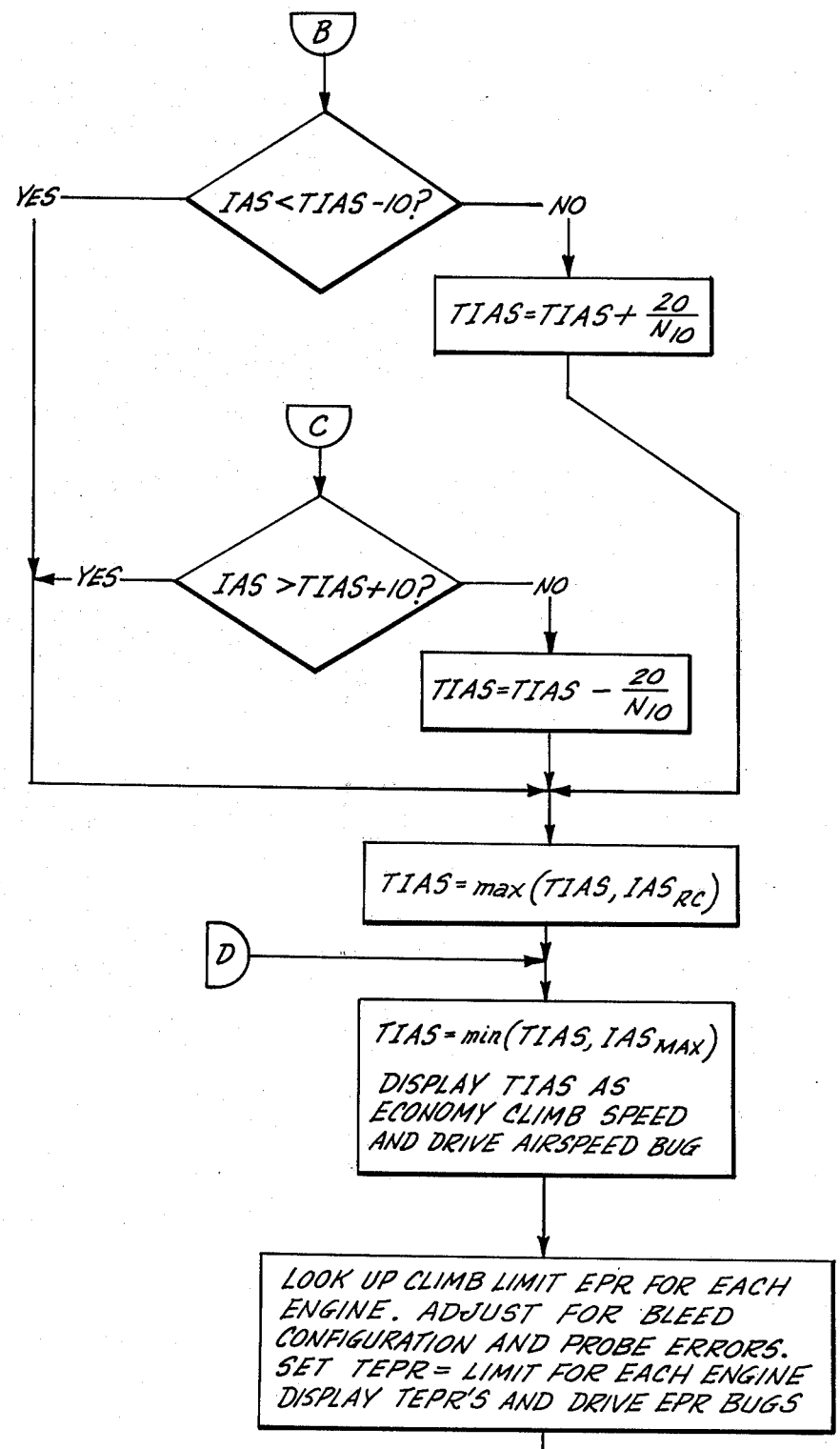

FIGS. 9A and 9B illustrate a data processor climb mode subroutine. This subroutine is entered, after a pass through the data conditioning subroutine is completed, if the CDU speed/thrust mode select switch 117 is in the climb (CLB) position. The first step of the climb mode subroutine is to determine the best rate of climb Mach, $M_{RC}$. The value of $M_{RC}$ is obtained by looking up values stored in tables, and interpolating as necessary. More specifically, as is well known to those skilled in the aircraft art, for any jet aircraft, there is a relationship between best rate of climb speed (which may be expressed in terms of Mach) and altitude, weight and ISA deviation (ISADEV). This relationship can be tabulated or graphed. Exemplary graphs are illustrated in the upper block in FIG. 9A. Specifically, three graphs are illustrated. The graphs plot $M_{RC}$ against altitude (ALT) for minimum ($W_{MIN}$) and maximum ($W_{MAX}$) values of gross aircraft weight (W). The first graph is for an ISADEV of minus fifteen (−15) and is identified by the notation ISA-15; the second graph is for an ISADEV of zero (0) and is identified by the notation ISA; and, the third graph is for an ISADEV of plus twenty (+20) and is identified by the notation ISA+20. In the data processor, this graphically displayed information is, as noted above, stored in tabular form. The value of $M_{RC}$ is obtained for a particular altitude value by looking up the $M_{RC}$ value, based on the value of W (lying between $W_{MIN}$ and $W_{MAX}$) determined during the data conditioning subroutine, for the ISADEV tables lying on either side of the ISADEV value also determined during the data conditioning subroutine. Then, the actual value of $M_{RC}$ is obtained by interpolating (in a straight line manner) between the two "looked up" values, based on where the ISADEV value lies between the two tables.

Subsequent to $M_{RC}$ being determined, the data processor converts $M_{RC}$ to $IAS_{RC}$ (indicated air speed for the best rate of climb) using the equation:

is located in a table stored in the data processor and reading out the related $IAS_{MAX}$ value.

Subsequent to the values of $RC_{MAX}$ and $IAS_{MAX}$ being determined, and stored in suitable memory bins, a test is made to determine whether or not the indicated airspeed (IAS) value received from the central air data computer is less than the indicated airspeed for the best rate of climb ($IAS_{RC}$) by five (5) knots per hour or more. If IAS is more than five knot per hour less than $IAS_{RC}$, the target indicated airspeed (TIAS) is set equal to $IAS_{RC}$ and stored. Under this set of conditions, the climb mode subroutine bypasses other steps and moves to point D in the portion of the climb mode subroutine illustrated in FIG. 9B. The next step, if this path is followed, is to set TIAS equal to the minimum of the $$IAS_{RC} = \sqrt{2.188(10^{-6})\left\{\left[\delta\left\{\left(\frac{M_{RC}^2}{5} + 1\right)^{3.5} - 1\right\} + 1\right]^{\frac{1}{3.5}} - 1\right\}} \qquad (5)$$

The next step in the climb mode subroutine is to determined the economic maximum rate of climb ($RC_{MAX}$) and the maximum indicated airspeed ($IAS_{MAX}$). The $RC_{MAX}$ value is looked up in a table that is based on the INDEX number inserted by the pilot. More specifically, the economic maximum rate of climb values ($RC_{MAX}$) based on INDEX values for the type of aircraft with which the invention is being used (e.g., Boeing 727) are stored in the data processor in tabular form (illustrated in graphical form in FIG. 9A). The INDEX vs. $RC_{MAX}$ (above a minimum $RC_{MAX}$ value determined by air traffic controller [ATC] limits or airline imposed limits) table values can be determined in either of two ways. First, computer profile of the aircraft can be "flown" in a series of computer "flights" between takeoff and a fixed distance, e.g., 300 miles from takeoff, each flight using different time and fuel costs (which define an INDEX value). The results of this computer analysis can be used to form the INDEX vs. $RC_{MAX}$ table. Alternatively, the aircraft can be actually flow from takeoff to a fixed distance point, while elapsed time and fuel use measurements are made. These measurements can then be used to calculate INDEX values; and the altitude reached at the fixed distance used to calculate $RC_{MAX}$ values. The end results can then be used to form the INDEX vs. $RC_{MAX}$ table. In any event, for lower INDEX values, the value of $RC_{MAX}$ is high. As the INDEX values increases, $RC_{MAX}$ decreases, until the minimum value of $RC_{MAX}$ is reached. Thereafter, $RC_{MAX}$ is maintained constant regardless of the INDEX value. This point is represented by the break in the INDEX vs. $RC_{MAX}$ curve illustrated in FIG. 9A. As noted above, this break point is set by the ATC or by the airline, if not set by the ATC. High time costs or low fuel prices lead to high INDEX values which in turn lower $RC_{MAX}$ thereby partially shifting the use of thrust from producing climb to flying faster.

The value of the speed limit ($IAS_{MAX}$) is obtained from the limiting $V_{MO}/M_{MO}$ boundary curves of the altitude versus true airspeed graph of the aircraft. This relationship, which is normally shown graphically, is well known to aircraft operators. $V_{MO}$ of course, stands for the maximum operating airpseed limit and $M_{MO}$ stands for the maximum operating Mach number limit. The lesser of these two speeds, $IAS_{MAX}$, is determined by looking up the altitude (ALT) at which the aircraft stored value of TIAS or the value of $IAS_{MAX}$. In other words, if $IAS_{MAX}$ is less than the stored TIAS value (which equals $IAS_{RC}$), the new TIAS is set equal to the value of $IAS_{MAX}$. Contrariwise, if the stored TIAS value is less than $IAS_{MAX}$, the new TIAS value is made equal to the stored TIAS. The stored TIAS value is then replaced by the new TIAS value. Thus a new TIAS value is now stored, which may be the same as the old TIAS value. After this step is complete, the stored (new) TIAS value is displayed as the economy climb speed. At the same time, if the engage button is actuated, the bug of the Mach/airspeed indicator is driven to the appropriate position, as previously described. The last step in the climb mode subroutine is to look up the climb limit EPR for each engine and adjust the value for bleed configuration and probe errors. More specifically, also stored in the data processor are the climb limit EPR values for each of the engines of the aircraft. These limit values must be adjusted for bleed configuration and probe errors in order for them to be useful. The data processor automatically performs these well known adjustments. After the appropriate adjustments are made, the target EPR (TEPR) limit for each engine is set to the adjusted limit values and displayed. At the same time, the EPR indicator bugs are driven to these limit positions, if the engage button is in its actuated position.

At this point, assuming the foregoing path of the climb mode subroutine has been followed, both the airspeed and the EPR bugs are set. The EPR bugs are set at the limit values. After the engines have been set to the target EPR (limit) values, the pilot adjusts the pitch attitude of the aircraft until the needle of the Mach/airspeed indicator points toward the Mach/airspeed indicator bug. When the pitch attitude of the aircraft is adjusted so that this condition is met, the aircraft will follow the desired climb profile.

Turning now to the path (FIG. 9A) followed if the indicated airspeed (IAS) is greater than the best rate of climb indicated airspeed ($IAS_{RC}$) or within five (5) knots of $IAS_{RC}$. In this case, a test is made to determine whether or not the actual rate of climb (RC), determined during the data conditioning routine, is greater than the economic maximum rate of climb ($RC_{MAX}$). If RC is greater than $RC_{MAX}$, the cycle moves to point B in FIG. 9B where a test is made to determine whether or not the indicated airspeed (IAS) is less than the presently stored TIAS minus ten (10) knots per hour. (The target indicated airspeed was stored during the first pass through the climb mode subroutine because, normally, during the first climb mode pass, at takeoff, IAS is always less than $IAS_{RC}-5$.)

If IAS is less than TIAS $-10$, the stored value of TIAS is updated to the maximum of TIAS (stored) or $IAS_{RC}$. If IAS is not less than TIAS $-10$, TIAS is incremented by a factor of $20/N_{10}$. (As previously noted, $N_{10}$ is equal to the number of data processor passes that occur in ten seconds.) Since the value of $N_{10}$ is fixed, and since twenty (20) is a fixed digit, TIAS is incremented by a fixed amount, such as one knot per second. Thereafter, the stored, incremented value of TIAS is updated to the maximum of TIAS (stored, incremented) or $IAS_{RC}$.

Turning now to the path that is followed if RC is not greater than $RC_{MAX}$. If RC is not greater than $RC_{MAX}$, the climb mode subroutine shifts to point C in FIG. 9B and a test is made to determine whether or not IAS is greater than the stored value of TIAS plus ten (10) knots per hour. If IAS is greater than TIAS $+10$, TIAS is updated to the maximum of TIAS (stored) or $IAS_{RC}$. If IAS is not greater than TIAS $+10$, TIAS is decremented by the value of $20/N_{10}$. After TIAS has been decremented by $20/N_{10}$, the stored value of TIAS is set to the maximum of TIAS (stored, incremented) or $IAS_{RC}$.

In summary, if IAS is less than $IAS_{RC}-5$, a speed/rate of climb trade off cycle is followed that first checks the current rate of climb (RC) against $RC_{MAX}$. If RC is greater than $RC_{MAX}$, TIAS is incremented, providing IAS is less than TIAS by more than ten knots. If RC is less than $RC_{MAX}$, TIAS is decremented, providing IAS is greater than TIAS by more than ten knots.

Regardless of the path followed to update TIAS to the maximum of TIAS (stored) or $IAS_{RC}$, after this step has been accomplished, TIAS is updated to the minimum of the new stored value of TIAS or $IAS_{MAX}$, as previously described. Thereafter, the "final" TIAS value for the economy climb mode is displayed and the bug of the Mach/airspeed instrument is driven to the appropriate position. Then, the climb limit EPR for each engine is looked up, and adjusted for bleed configuration and probe errors. Thereafter, the target EPR (TEPR) values are set to the thusly adjusted limit values for each engine. Next, the TEPR values are displayed and the EPR bugs are driven to the appropriate positions.

As noted above, normally, during the first pass through the climb mode subroutine IAS is less than $IAS_{RC} -5$, as a result TIAS is set to the value of $IAS_{RC}$. While unlikely, it is potentially possible that IAS could be greater than $IAS_{RC}-5$ during the first pass. The situation could occur if an engine should fail and then be re-energized, for example, just prior to switching the speed/thrust mode select switch 117 to the CLB position. If this situation occurs, the TIAS value would be zero during the first pass through one of the paths shown in the upper part of FIG. 9B. However, this will not create an unacceptable situation because TIAS is set to the value of $IAS_{RC}$ during the step where TIAS is set to the maximum value of TIAS or $IAS_{RC}$. Hence, this step provides protection for the possible, but unlikely circumstance, that a TIAS value equal to $IAS_{RC}$ is not set during the first pass through the climb mode subroutine.

Figure 10A:
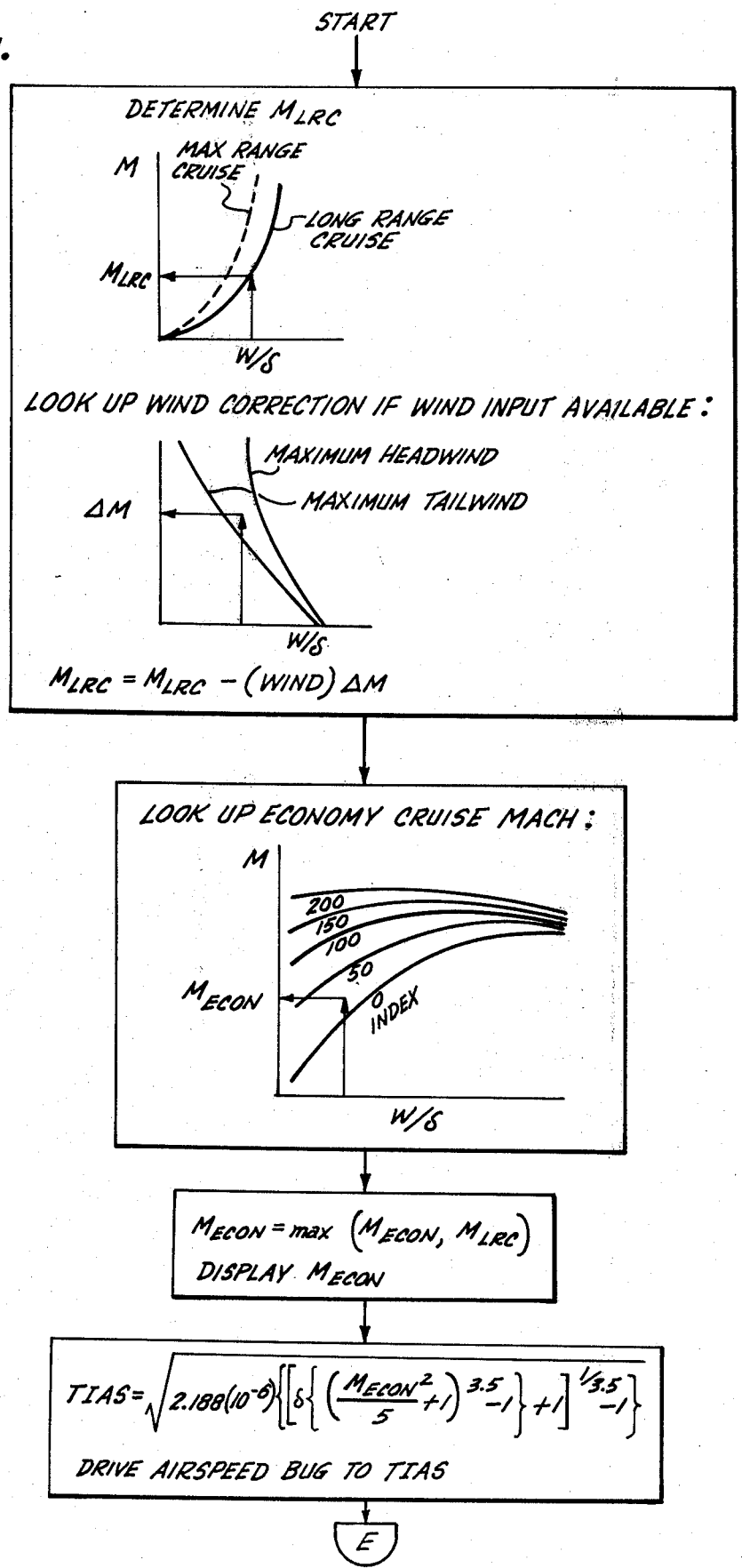
FIGS. 10A and 10B form a composite flow diagram illustrating the cruise mode subroutine of the data processor.
Figure 10B:
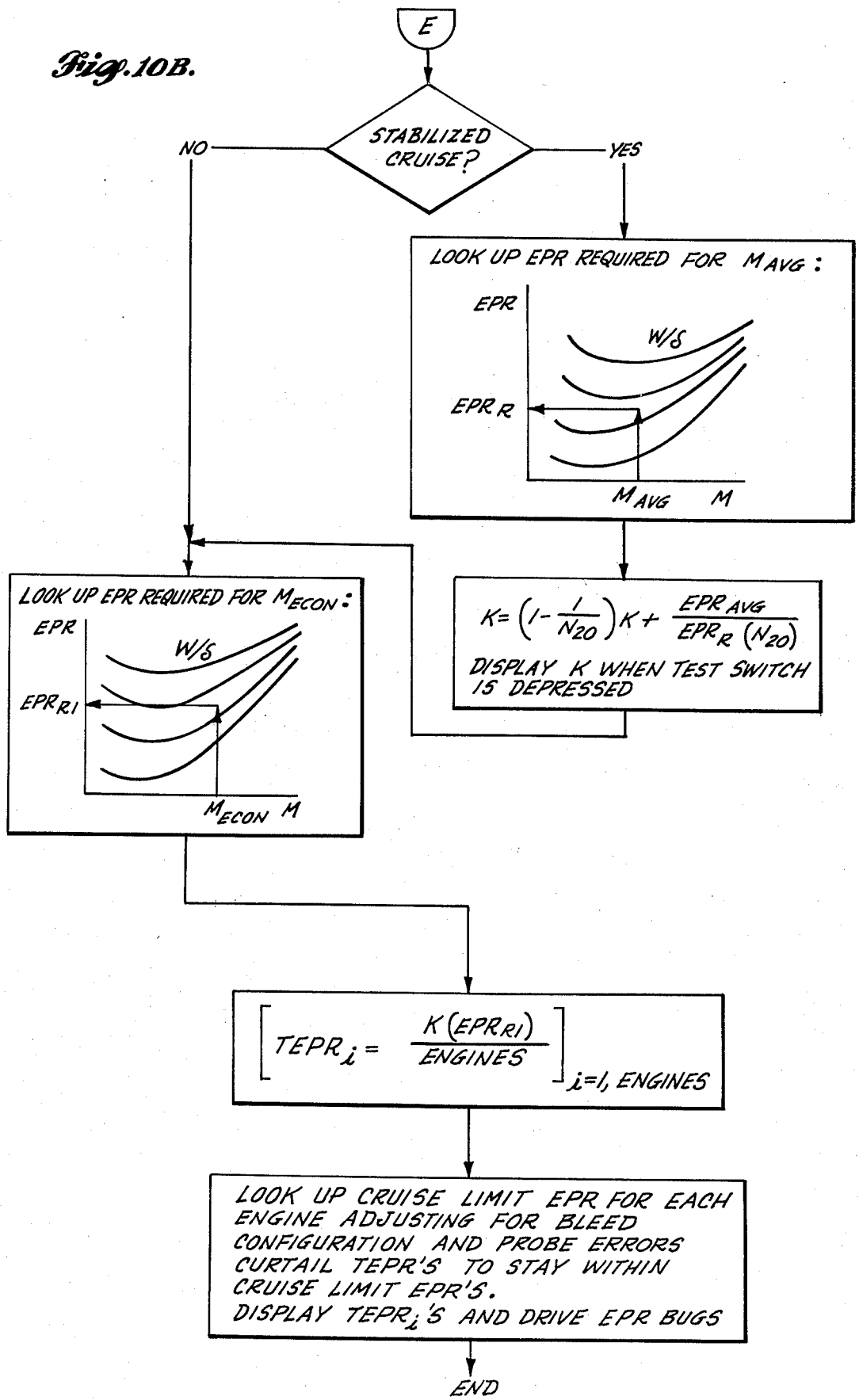

When the speed/thrust mode select switch 117 of the CDU is switched to its cruise (CRZ) position, at the end of the next pass through the data conditioning subroutine, the data processor automatically shifts to the cruise mode subroutine, shown in FIGS. 10A-B. The first step of the cruise mode subroutine is to determine a long range cruise Mach ($M_{LRC}$) value for still air, i.e., no wind, to be used as the lower boundary of a usable speed envelope. The long range cruise speed is defined as the speed, faster than the maximum range cruise speed, at which fuel mileage is decreased by one percent (1%) from the maximum possible. It is so defined because of the lack of speed/thrust stability at maximum range (maximum fuel mileage) speeds when an aircraft is under manual throttle control. The theoretical one percent (1%) fuel mileage decrease is intended to compensate for the acceleration and deceleration resulting from manual control. If the invention is used with an autothrottle, a maximum range cruise Mach number can be substituted for the long range cruise Mach number.

As illustrated in FIG. 10A, $M_{LRC}$ is a hyperbolic function of $W/\delta$. The specific functional interrelationship is that of a cubic polynomial of the type set forth below:

$$M_{LRC} = C_0 + C_1(W/\delta) \times 10^{-5} + C_2[(W/\delta) \times 10^{-5}]^2 + C_3[(W/\delta) \times 10^{-5}]^3 \quad (6)$$

where $C_0$, $C_1$, $C_2$ and $C_3$ are constants whose actual value is related to the type of aircraft with which the invention is being used. As before, the relationship between $M_{LRC}$ and $W/\delta$ is stored in tabular form in the data processor.

If a wind value has been inserted into the data processor via the CDU, as previously discussed, the next step of the cruise mode subroutine is to determine a wind correction factor in terms of Mach. The wind correction factor ($\Delta M$) is a function of wind and $W/\delta$. Thus, as illustrated in FIG. 10A, the wind correction factor is obtained from a table (shown pictorially as a graph) based on the $W/\delta$ value and the value of the headwind (or tailwind). After the wind correction factor ($\Delta M$) has been determined, $M_{LRC}$ is corrected by multiplying the wind correction factor $\Delta M$ by the wind value and summing this product with $M_{LRC}$. By convention, headwinds are defined as negative. Headwinds therefor have the effect of increasing the long range cruise speed. Conversely tailwinds will tend to decrease this speed. Thus, an updated $M_{LRC}$ value is obtained, which is stored for future use.

The next step of the cruise mode subroutine is to determine an economy cruise Mach ($M_{ECON}$) value. $M_{ECON}$ is a function of the flight index (INDEX) value and the value of $W/\delta$. This functional relationship, for any particular aircraft, can also be developed in the manner previously discussed with respect to the INDEX vs. $RC_{MAX}$ functional relationship (FIG. 9A). That is, an aircraft computer profile can be flown using different $W/\delta$ values and different INDEX (time/fuel relationship) values. Alternatively, an actual model of the aircraft can be flown in a stabilized cruise mode of operation for a variety of $W/\delta$ and INDEX values. In either case, a tabular relationship between $W/\delta$, INDEX and $M_{ECON}$ is developed. The resultant tables are stored in the data processor so that the value of $M_{ECON}$ can be looked up. If necessary, linear interpolation techniques are used when the actual INDEX value lies between tabulated INDEX values. After $M_{ECON}$ is looked up, it is updated by setting $M_{ECON}$ equal to the maximum of $M_{ECON}$ (looked up) or $M_{LRC}$, and the result is display as the economy cruise speed in Mach form, as shown in FIG. 7B.

The next step in the cruise mode subroutine is to determine the value of the target indicated airspeed. The value of TIAS is determined using Equation (5), replacing $M_{RC}$ with $M_{ECON}$. After the value of TIAS has been determined, the bug of the Mach/airspeed indicator is driven to the appropriate position, assuming that the ENGAGE button is actuated.

The cruise mode subroutine now shifts to FIG. 10B (point E). The first step of this part of the cuise mode subroutine is to check the state of the indicator denoting stabilized cruise (or lack thereof). (As will be recalled, tests are made during the data conditioning subroutine to determine if the aircraft is in or not in a stabilized cruise mode of operation). If the aircraft is in a stabilized cruise mode of operation, the value of the K factor is updated. The K factor is a selfcorrection factor that starts at one (1) and is modified to adapt data to the specific airplane of the model type (e.g., BOEING 727) with which the invention is being used, as discussed above. The value of the K factor is updated by first looking up the engine pressure ratio required ($EPR_R$) to achieve the $M_{AVG}$ value, determined during the data conditioning subroutine, as a function of $W/\delta$. This tabulated data is obtained by flight testing the aircraft model type. After the $EPR_R$ value is determined, the value of the K factor is updated using the following equation:

$$K = \left(1 - \frac{1}{N_{20}}\right) K_L + \frac{EPR_{AVG}}{EPR_R(N_{20})} \quad (7)$$

where: $K_L$ is the previous or last value of the K factor. It should be noted that K remains the same if $EPR_{AVG}$ equals $(K_L)(EPR_R)$. That is, if the $EPR_{AVG}$ value necessary to achieve $M_{AVG}$ is the same as the $(K_L)(EPR_R)$, K remains constant. If these values differ, K is modified by an averaged ($N_{20}$) fractional value. The averaging factor, $N_{20}$, is equal to the number of data processor passes that occur in 20 seconds. The value of the K factor is stored in a suitable storage bin and is displayed when the test switch is depressed.

The next step in the cruise mode subroutine (which occurs if the aircraft is not in a stabilized cruise mode of operation or after K has been determined, if the aircraft is in a stabilized cruise mode of operation), is to look up the EPR value required ($EPR_{RI}$) to obtain a Mach value equal to $M_{ECON}$. The same table used to look up $EPR_R$ for $M_{AVG}$ is used to obtain $EPR_{R1}$ for $M_{ECON}$.

The next step in the cruise mode subroutine is to determine the target engine pressure ratio (TEPR) for each engine. These values are obtained by multiplying $EPR_{R1}$ times K and dividing the result by the number of engines. In other words, $EPR_{R1}$ is the total of the engine pressure ratio values for all engines. To determine the value of TEPR for each engine, $EPR_{R1}$ is divided by the number of engines. To adapt the $EPR_{R1}$ values to the particular aircraft, the result of the dividing step is multiplied by K. Thus, the system adjusts target thrust values to compensate for specific airplane peculiarities. After the TEPR values are obtained, the cruise limit EPR for each engine is looked up and adjusted for bleed configuration and probe errors. Then, a test is made to determine whether the TEPR values are less than the related engine limit EPR values. If any TEPR value is more than the related engine limit EPR value, the TEPR value is curtailed to the engine limit EPR value. The final step of the cruise mode subroutine is to display the resultant TEPR values and drive the EPR bugs to these TEPR values, if the ENGAGE button is actuated.

As with the climb mode of operation, after the bugs are set, the pilot adjusts his throttles so that the EPR instrument needles point toward the EPR bug settings. Unlike the climb mode, pitch attitude is used to maintain a constant pressure altitude during cruise. When the pilot maintains the thrust called for by the EPR bug settings, the airplane can be expected to hold the airspeed (TIAS) called for by the airspeed bug. If the aircraft does not maintain this TIAS, the calculated K factor is in error. As the data processor cycles through the cruise mode subroutine, the K factor will change until the TIAS can be met when the EPR indicator needles point toward the EPR bugs.

It is pointed out here that the TEPR values will change (unless they are the limit EPR values) during the cruise mode of operation. More specifically, as fuel is burned, $W/\delta$ will change because W is equal to the zero fuel weight (ZFW) plus the average fuel weight. As a result of $W/\delta$ changing, $M_{ECON}$, $EPR_R$, TIAS and other values will change. Thus, during a flight, the data processor automatically modifies the bug control signals in accordance with the changes in factors that affect the economic aspects of the flight. Of course, the pilot must change his throttle settings as the bug positions change.

Figure 11:
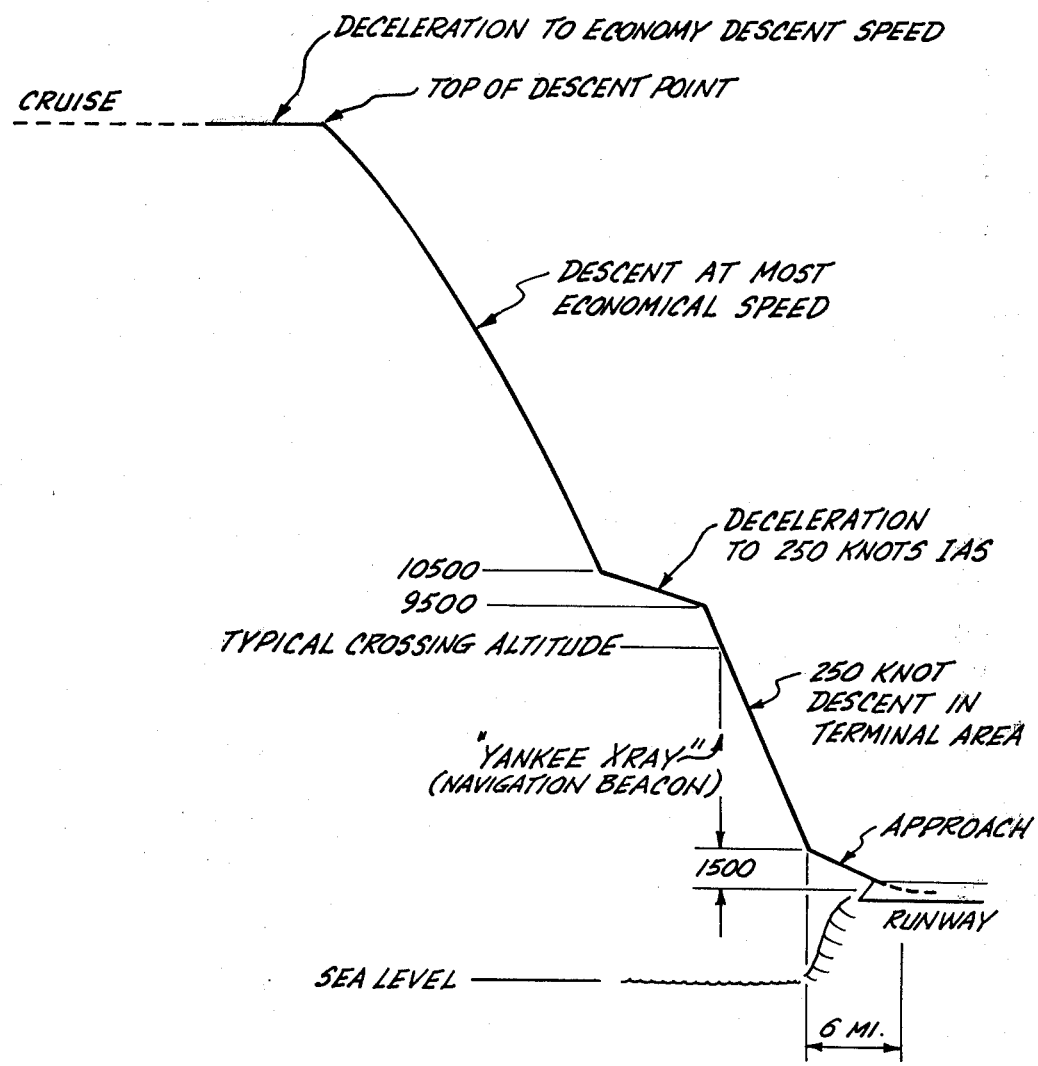
FIG. 11 is a descent profile diagram.

FIGS. 11, 12 and 13A-13F are all directed to the descent mode subroutine of the data processor of the invention. FIG. 11 illustrates a typical descent profile of an aircraft descending from a cruise altitude to the runway of a destination airport. FIG. 12 is a simplified diagram of the descent mode subroutine and FIGS. 13A-13F are detailed diagrams of the descent mode subroutine. Prior to discussing the descent mode subroutine illustrated in FIGS. 12 and 13A-13F, a brief discussion of the typical descent profile illustrated in FIG. 11 is set forth.

Near the end of the cruise mode of operation, the aircraft decelerates to the economy descent speed. (As will be better understood from the following discussion, the descent mode subroutine provides information regarding the economy descent speed and the distance required to achieve this speed and descend to a predetermined altitude or to the runway.) Preferably, the descent speed is reached at the exact point where the economic descent speed results in a regulated descent in the most economical manner. This point is denoted "top of descent point" in FIG. 11.

Subsequent to the top of descent point being reached, the aircraft descends at its most economical speed to a predetermined altitude, normally about 10,500 feet. At 10,500 feet, the airspeed is reduced to 250 knots indicated airspeed, based on the fact that normally an aircraft is restricted by the air traffic controller (ATC) to a speed of 250 knots or less under 10,000 feet. (If some other ATC restriction has been entered, the entered restriction is followed.) As a result, by the time the aircraft reaches 9,500 feet, the speed has been reduced to the appropriate level. The aircraft normally continues a 250 knot descent until the glide slope is intersected. The glide slope is tracked to the runway threshold while the aircraft is decelerated to approach speed and stabilized in its landing configuration.

As will be readily appreciated by those skilled in the aircraft art, a navigation beacon is a transmitting station that the pilot may be instructed to crossover at a particular altitude, such as 8,000 feet; and, report the crossing to the ATC. For example, the ATC may request that the pilot report crossing "YANKEE X RAY" at 8,000. The pilot is required to descend to 8,000 feet by the time the aircraft crosses navigation beacon YANKEE X RAY. In order to achieve minimum descent costs, the pilot should reach the YANKEE X RAY beacon and 8,000 feet at precisely the same time, without using speed breaks to prevent overshoot or costly low level cruise acceleration because of undershoot.

The descent mode subroutine illustrated in FIGS. 12 and 13A–13F provide CDU displays that are useful to the pilot during descent. In essence, the descent mode subroutine determines where the pilot is in the descent profile and provides distance and speed information to either the runway or to the navigation beacon. In this regard, rather than starting at the top of descent point, the descent mode subroutine starts at the runway and proceeds backwards from touchdown toward cruise altitude, and displays the information developed when the position of the aircraft along the descent profile is determined.

FIG. 12 illustrates the main steps of the descent mode subroutine. These main steps are illustrated in more detail in FIGS. 13A–13F, hereinafter described. When the pilot places the speed/thrust mode select switch in the descent (DES) position, the descent mode subroutine is automatically entered after the next pass through the data conditioning subroutine. The first main step of the descent mode subroutine is to determine whether or not the actual altitude is more or less than 1,500 feet above the elevation of the destination airport (DELV). If the altitude is less than DELV+1,500 feet, the aircraft is on final approach (see FIG. 11). Since the aircraft is on final approach, the descent display is terminated; and, the CDU displays a message suggesting a go-around mode (not described herein) be activated.

Assuming the aircraft is above DELV+1,500 feet, a test is made to determine whether or not the crossing altitude of a navigation beacon (ELV) has been entered by the pilot. If no crossing altitude has been entered, the horizontal distance (MILES) covered during a descent to touchdown (TD) from ALT of 9,500 feet, whichever is greater, is determined. Then the target indicated airspeed (TIAS) is set equal to 250 knots (or some other ATC or airline imposed limit on speed below 10,000 feet, if one has been entered). Next a test is made to determine if ALT is above or below 9,500 feet. If ALT is below 9,500 feet, MILES and TIAS are displayed. As illustrated in FIG. 7C, a destination airport altitude also may be displayed. Or, idle EPR values may be displayed, if desired. Still further, both types of information can be displayed either on a line display containing more than three lines or on two pages of a display.

If ALT is above 9,500 feet, an economy indicated airspeed ($IAS_E$) is determined. Then, the horizontal distance covered during a deceleration from $IAS_E$ to 250 knots (or the alternate speed inserted because of ATC or airline imposed restrictions) is determined. Next a test is made to determine whether or not ALT is above or below 10,500 feet. If ALT is below 10,500 feet, the horizontal deceleration distance proportional to the value of ALT between 9,500 feet and 10,500 feet is added to the prior value of MILES and the new MILES value is displayed. At the same time, TIAS (250 knots or the alternative appropriate value) is displayed. Also, the elevation of the destination airport (DELV), plus EPR values etc., are displayed as desired.

If ALT is above 10,500 feet, the initial MILES value is increased by the total horizontal deceleration distance between 10,500 feet and 9,500 feet, rather than a proportional amount. The next step is to determine the horizontal distance ($\Delta$ miles) to 10,500 feet. After this distance is determined, the last MILES value is increased by the horizontal distance covered during a descent to 10,500 feet from the present altitude (ALT). At this point, it is assumed that the actual descent speed will be the most economical descent speed.

The next step is to determine if the actual speed is equal to the most economical descent speed. At this time, the target indicated airspeed (TIAS) is set equal to the most economical descent speed. After the actual speed is determined, a test is made to determine whether or not deceleration to the most economical descent speed is necessary. If no deceleration is necessary, i.e., the airplane is at or below the most economical descent speed, the last MILES value is displayed. In addition, TIAS (most economical descent speed) is displayed. Finally, the elevation of the destination airport (DELV), EPR values, etc., are displayed.

If deceleration to the most economical descent speed is necessary, a determination of the horizontal distance needed for a deceleration from the actual speed to the most economical descent speed is made. This deceleration distance is then added to the last MILES value and the result is displayed as the MILES to the destination airport. In addition, TIAS (most economical descent speed) is displayed along with the elevation of the destination airport (DELV), EPR values, etc.

At this point, all of the various paths illustrated on the left side of FIG. 12 have been discussed. These paths are followed when no navigation beacon crossing altitude (ELV) has been entered. As a result, all of the calculations and displays relate to the destination airport. As can be seen, the descent mode subroutine, in this situation, as previously discussed, starts at the destination airport and moves back up the descent profile. Each section of the descent profile above 1,500 feet is covered in sequence until it is determined that ALT lies in the section being covered. When this condition is met the calculated (or predetermined) values of MILES and TIAS, plus other desired information, is displayed.

The paths of the descent mode subroutine that are followed when an ELV value is inserted are illustrated on the right side of FIG. 12. The first step, after a determination is made that an ELV value has been entered, is to determine whether or not the ELV value is above 9,500 feet. If ELV is below 9,500 feet, a determination of the horizontal distance (MILES) required for a descent to ELV from ALT or 9,500 feet is made. After this MILES value is determined, the subroutine shifts to the path previously discussed (i.e., the path where no ELV has been loaded) and enters this path above the point (K) where TIAS is set equal to 250 knots (or some other appropriate value). Thereafter, the appropriate path of the portion of the descent mode subroutine illustrated on the left of FIG. 12, i.e., the paths previously described, is followed. Since these paths have been previously described, they will not be reiterated here. It is important to note, however, that the MILES value now being determined is to the navigation beacon, not the distance to the destination airport. It is also important to note that if a zero MILES value is determined, i.e., ALT is below ELV, the MILES display is set to zero.

If ELV is greater than 9,500 feet, the economy indicated airspeed ($IAS_E$) is determined. In addition, the horizontal deceleration distance needed for a deceleration from $IAS_E$ to 250 knots (or some other appropriate ATC or airline set value) is determined. Then a test is made to determine whether or not ELV is above 10,500 feet. If ELV is less than 10,500 feet, a determination of the deceleration distance needed for a descent to ELV from ALT or 10,500 feet is made. Then TIAS is set to 250 knots (or some other appropriate value). Next a test is made to determine whether or not ALT is above or below 10,500 feet. If ALT is below 10,500 feet, the horizontal deceleration distance needed for a deceleration from $IAS_E$ to 250 knots is displayed as MILES to ELV (zero if negative) and TIAS is displayed as 250 knots. In addition, the beacon crossing altitude (ELV-),EPR values, etc. may be displayed, if desired, as previously discussed.

If ALT is above 10,500 feet, the subroutine shifts to the previously described path wherein ELV has not been entered just above the point (G) where a determination is made of the distance between ALT and 10,500 feet and MILES is increased by the resultant Δ MILES value. Thereafter, the other steps of this portion of the subroutine illustrated in the lower left hand side of FIG. 12, are followed, as previously described.

If ELV is found to be above 10,500 feet, a determination of the horizontal distance for a descent from ALT to ELV is made. Thereafter, the subroutine shifts to the previously described path where an ELV figure has not been entered just above the point (M) where the actual descent speed is determined and TIAS is set to $IAS_E$. Thereafter, the other steps of this portion of the subroutine are followed, as previously described.

In summary, when an ELV value is inserted, the descent mode subroutine determines the distance (MILES) needed for a descent from the present altitude (ALT) to the ELV altitude, including deceleration from the present speed to the appropriate descent speed. When the aircraft drops below the ELV altitude, the miles display is set equal to zero. In essence, the path of the descent mode subroutine followed determines where the ELV altitude is with respect to the present altitude (ALT) of the aircraft in a segmented manner that moves backwards, up the descent profile.

Figure 13A:
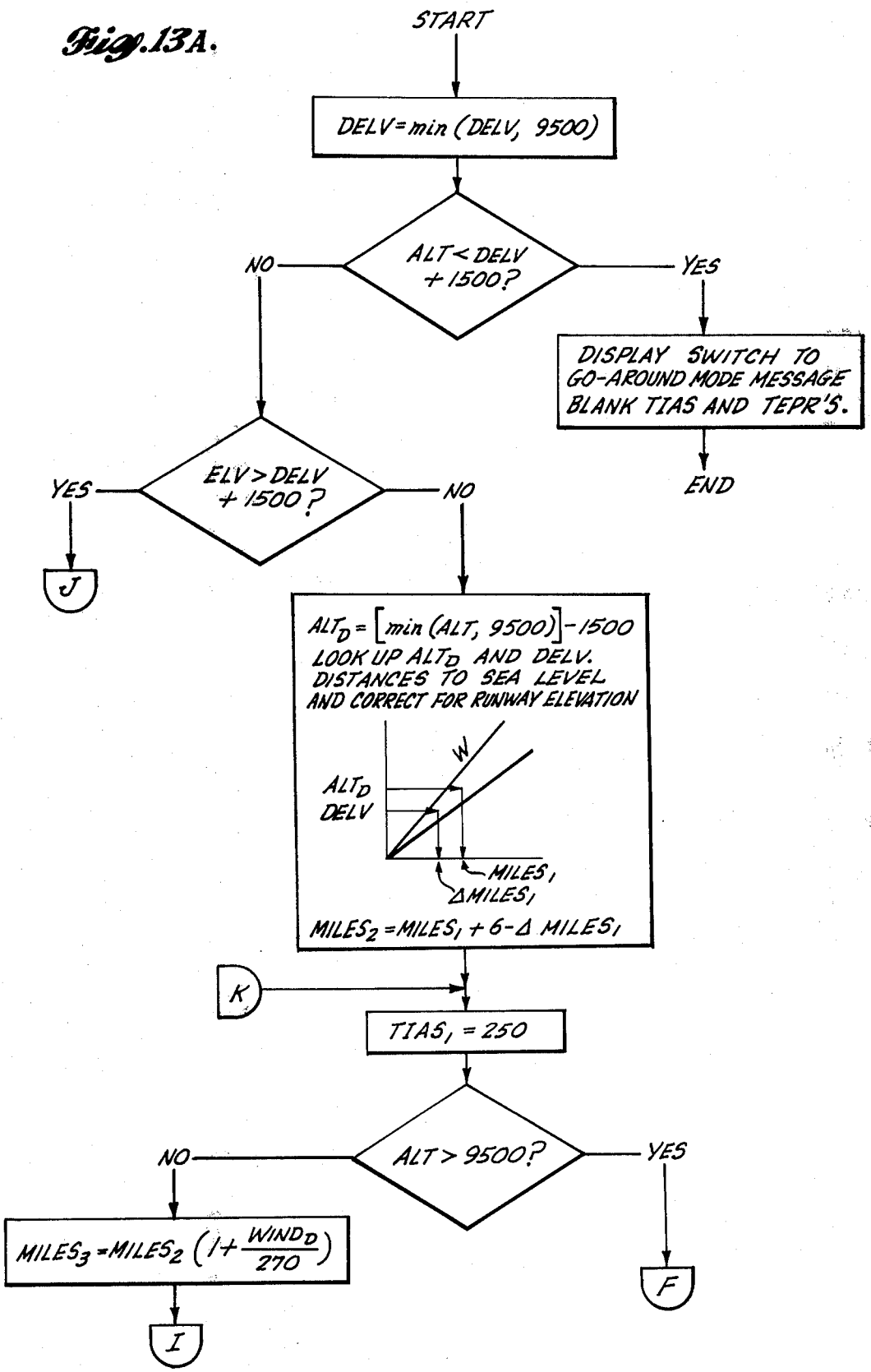
FIGS. 13A, 13B, 13C, 13D, 13E and 13F form a composite flow diagram illustrating in more detail the descent mode subroutine of the data processor illustrated in FIG. 12; and, FIG. 14 is a block diagram of an economy performance data avionics system formed in accordance with the invention wherein the signals adapted to control the bugs of a Mach/airspeed indicator and EPR indicators are also utilized to control autothrottles and an autopilot.

Turning now to 13A–13F, which illustrate the descent mode subroutine in more detail, as shown in FIG. 13A, when the descent mode subroutine is entered, the destination elevation (DELV) is set to the minimum value of the DELV loaded by the pilot, or 9,500 feet. In other words, DELV is arbitrarily limited to a maximum of 9,500 feet. In this regard, it should be noted that only two major airports, La Paz, Bolivia and Cuzco, Peru, have elevations above 9,500 feet. Thus, normally DELV will be set to the value loaded by the pilot.

Next, as previously discussed, a test is made to determine whether or not the actual altitude (ALT) is above or below DELV+1,500 feet. If ALT is less than DELV+1,500 feet, the aircraft is on final approach (see FIG. 11). Since the aircraft is on final, the descent display is terminated, and the CDU displays a message suggesting that the go-around display be activated.

If the aircraft is above DELV+1,500 feet, a test is made to determine whether or not the crossing altitude of a navigation beacon (ELV) has been entered. This is done by determining if ELV is greater than DELV+1,500 feet. If no navigation beacon altitude has been entered, ELV is zero. Thus, the appropriate one of the "runway" paths illustrated on the left side of FIG. 12 is followed. If ELV is found to be greater than DELV+1,500 feet, the appropriate one of the "navigation beacon" paths illustrated on the right side of FIG. 12 is followed.

Assuming that no ELV value has been entered, the next step of the "runway" paths of the descent mode subroutine is to set an intermediate descent phase altitude ($ALT_D$) to the minimum of ALT or 9,500 feet minus 1,500 feet. Next, a determination of the horizontal distance ($MILES_1$) to be flown for a descent between $ALT_D$ and sea level and the horizontal distance (Δ $MILES_1$) to be flown for a descent between DELV and sea level is determined. More specifically, the horizontal distance covered by the aircraft from $ALT_D$ and DELV to sea level at a constant known descent speed is determined by looking up the desired $MILES_1$ and Δ $MILES_1$ values in a table that relates altitude, aircraft gross weight and horizontal distance for a known descent speed (e.g., 250 knots or some other appropriate ATC or airline set value) for the aircraft with which the invention is being used. Since $ALT_D$ is 1,500 feet below ALT, the $MILES_1$ value is the miles to be covered during the descent from ALT to 1,500 feet above sea level. The Δ $MILES_1$ value is used to compensate for the fact that the airport is not at sea level. More specifically, after $MILES_1$ and Δ $MILES_1$ have been determined, a distance figure ($MILES_2$) is determined by adding six miles to $MILES_1$ and subtracting Δ $MILES_1$. $MILES_2$ is thus the horizontal distance that will be covered by the aircraft as it descends from ALT to 1,500 feet above DELV, plus the approach distance (six miles, see FIG. 11). Next, the target indicated airspeed ($TIAS_1$) is set at 250 knots (or some other appropriate value, as noted above), since at this time the descent mode subroutine is assuming that the aircraft is below 9,500 feet. Next, a determination is made as to whether or not ALT is above or below 9,500 feet.

If ALT is below 9,500 feet, $MILES_2$ is updated by a wind correction factor using the equation:

$$MILES_3 = MILES_2 \left(1 + \frac{WIND_D}{270}\right) \quad (8)$$

270 (knots) is a correction factor that corrects the wind value for an approximate indicated true airspeed of 250 knots. Since the altitude of the aircraft is below 9,500 feet, the subroutine shifts to the display section (point I) illustrated in FIG. 13D and $MILES_3$ and $TIAS_2$ are displayed. In addition, the elevation of the destination airport (DELV) and any other desired information is displayed. When the ENGAGE button is thereafter actuated, the Mach/airspeed and EPR bugs are driven to their respective values of 250 knots and idle EPR.

Figure 13B:
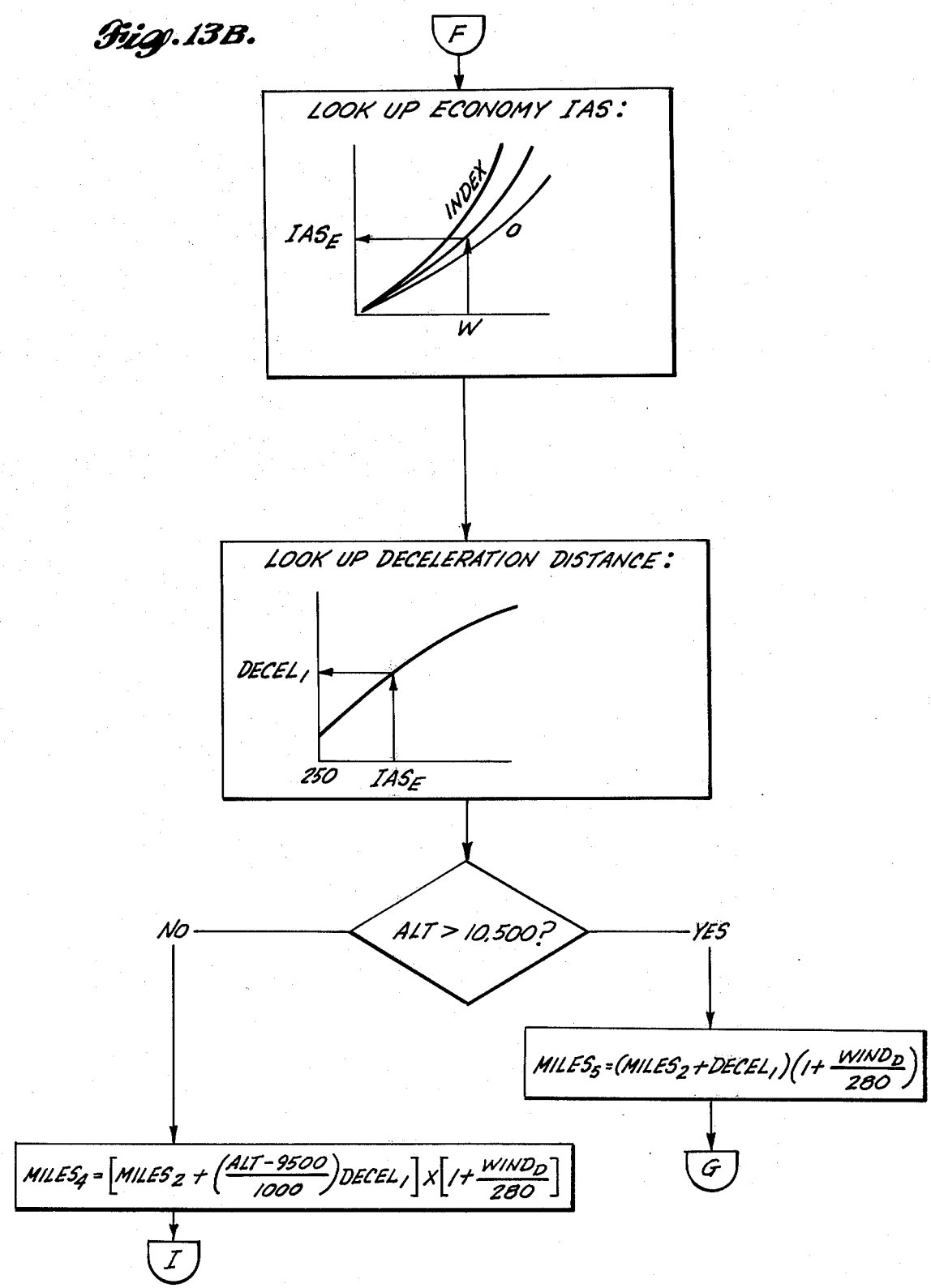

If the altitude of the aircraft is found to be above 9,500 feet, rather than correcting for wind and shifting to the display section, the descent mode subroutine shifts to the portion thereof shown in FIG. 13B (point F). The first step of the path followed by the descent mode subroutine when ALT is above 9,500 feet is a determination of the most economical descent speed ($IAS_E$), based on gross weight (W) and the INDEX number. This information is again stored in tabular form in the memory of the data processor and is keyed to the aircraft model. That is, the tabulated $IAS_E$ information is developed either by running a sequence of computer "flights" for different parameter (W and INDEX) variations or by actually flying the aircraft under different parameter conditions. After $IAS_E$ is determined, the horizontal distance covered by the aircraft as it decelerates from $IAS_E$ at 10,500 feet to 250 knots at 9,500 feet is determined. This deceleration distance ($DECEL_1$) is obtained from a further table stored in the data processor relating deceleration distance to indicated airspeed at the relevant altitudes. Again this table is keyed to the aircraft model with which the invention is being used and is produced by computer "flights" or actual aircraft model flights.

The next step in this path of the descent mode subroutine is to determine whether or not the aircraft altitude (ALT) is above or below 10,500 feet. If the altitude is below 10,500 feet, the deceleration distance ($DECEL_1$) is ratioed over the thousand foot descent from 10,500 to 9,500 feet and the result added to the descent distance ($MILES_2$) below 9,500 feet. The result of this calculation is then corrected for wind effect using an approximate average true airspeed correction of 280 (knots). More specifically, these steps are accomplished using the equation:

$$MILES_4 = \left[ MILES_2 + \left( \frac{ALT - 9500}{1000} \right) DECEL_1 \right] \times \left[ 1 + \frac{WIND_D}{280} \right] \quad (9)$$

The subroutine then shifts to the display step (point I) and $MILES_4$ is displayed along with a TIAS value of 250 knots.

If the altitude of the aircraft (ALT) is found to be above 10,500 feet, $MILES_2$ is increased by the entire deceleration distance and the result is corrected for wind effect using the formula:

$$MILES_5 = (MILES_2 + DECEL_1)\left( 1 + \frac{WIND_D}{280} \right) \quad (10)$$

Figure 13C:
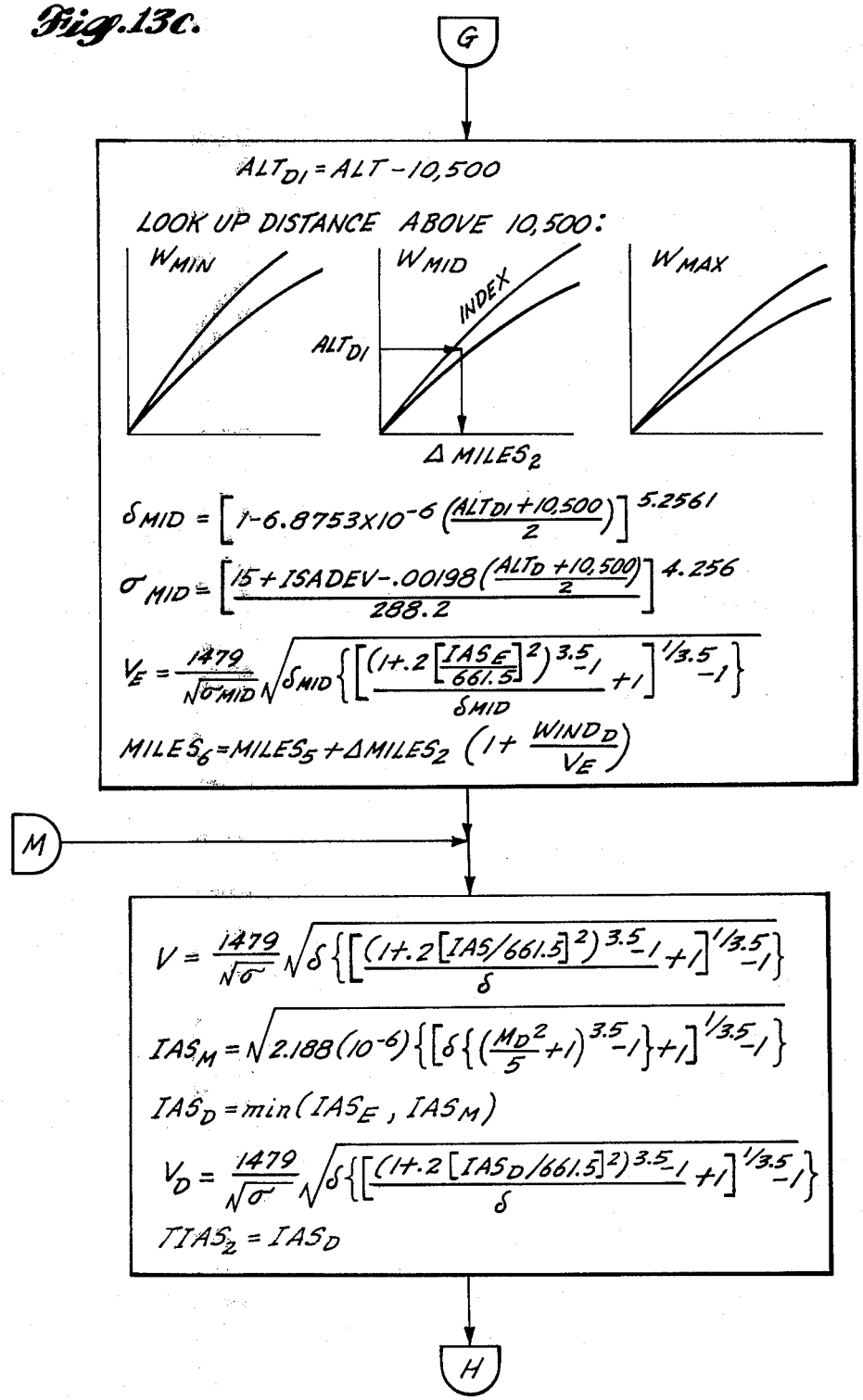
Figure 13D:
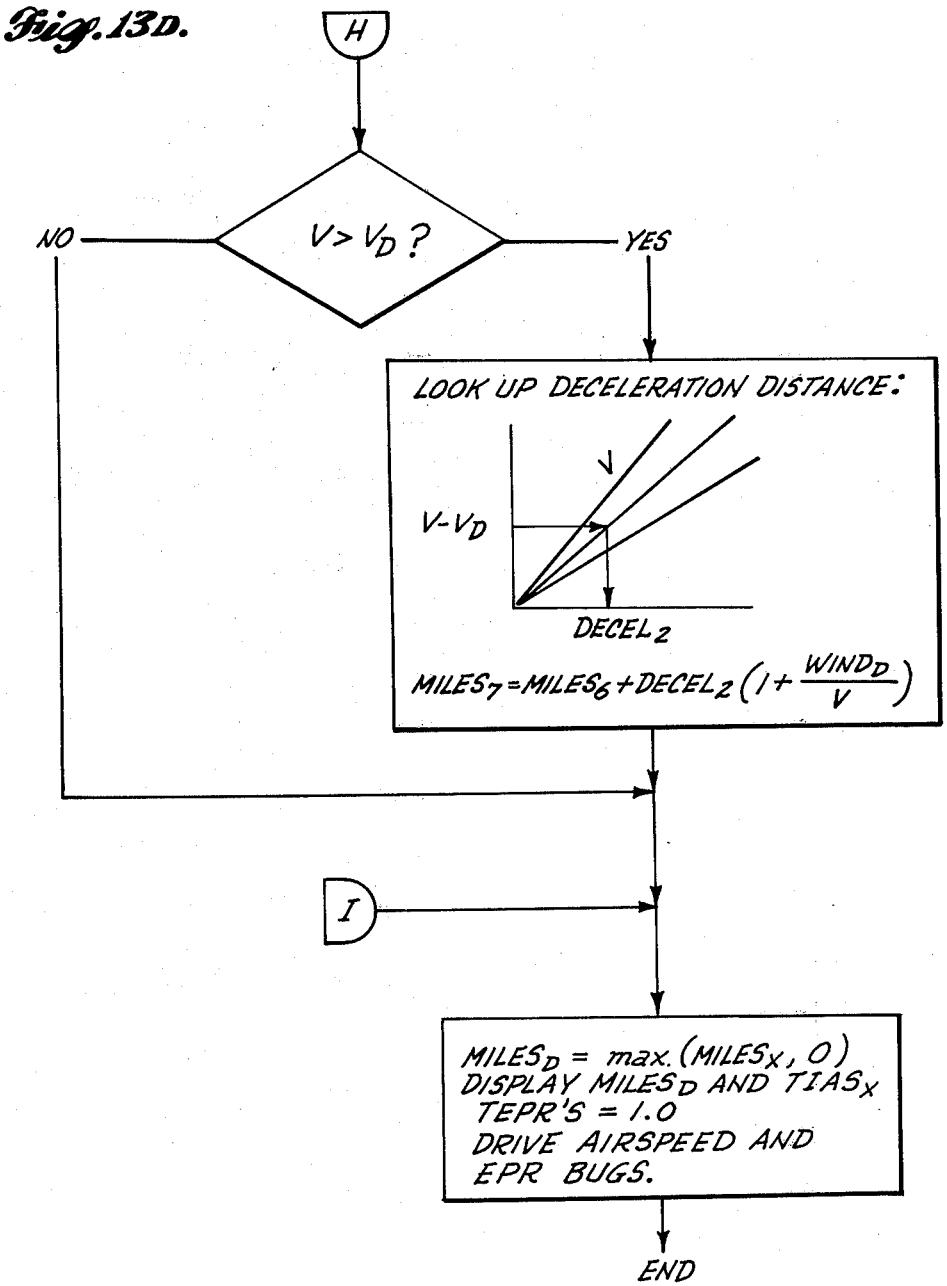

Thereafter, the descent mode subroutine shifts to the steps illustrated in FIG. 13C (point G).

The first step of the portion of the descent mode subroutine illustrated in FIG. 13C is the determination of an intermediate altitude value ($ALT_{D1}$). $ALT_{D1}$ is determined by subtracting 10,500 feet from the actual altitude value (ALT). Then, a determination of the horizontal descent distance ($\Delta$ $MILES_2$) for a descent from $ALT_{D1}$ to 10,500 feet is made as a function of the gross weight of the aircraft (W) and INDEX. Again, this information is "looked up" in tables stored in the data processor and developed by computer "flights" or actual flights of the aircraft model. If the actual value of the gross weight or INDEX lies between tabulated values, linear interpolation takes place. For example, as illustrated in FIG. 13C, three tables (illustrated as graphs) may be included for three different gross aircraft weights (a minimum gross weight value, a mid gross weight value, and a maximum gross weight value). A linear interpolation technique is followed to determine the exact value of $\Delta$ $MILES_2$ for a particular INDEX number when the gross weight lies between two of these "tables". Similarly, if a specific INDEX number is not tabulated per se, linear interpolation between INDEX numbers takes place.

Because the aircraft is above 10,500 feet, an approximate true airspeed of 280 knots, based on deceleration to 250 knots cannot be used. Rather, it is necessary to determine an approximate average true airspeed. In order to do this, it is first necessary to determine values for $\delta$ and $\sigma$ midway between the current altitude and 10,500 feet ($\delta_{MID}$, $\sigma_{MID}$). $\delta_{MID}$ is determined by the equation:

$$\delta_{MID} = \left[ 1 - 6.8753 \times 10^{-6} \left( \frac{ALT_{D1} + 10500}{2} \right) \right]^{5.2561} \quad (11)$$

and $\sigma_{MID}$ is calculated in accordance with the equation:

$$\sigma_{MID} = \left[ \frac{15 + ISADEV - .00198\left( \frac{ALT_{D1} + 10500}{2} \right)}{288.2} \right]^{4.256} \quad (12)$$

Subsequent to $\delta_{MID}$ and $\sigma_{MID}$ being determined, the standard equation $$V_E = \frac{1479}{\sqrt{\sigma_{MID}}} \sqrt{\delta_{MID}\left\{ \left[ \frac{\left(1 + .2\left[\frac{ISA_E}{661.5}\right]^2\right)^{3.5} - 1}{\delta_{MID}} + 1 \right]^{1/3.5} - 1 \right\}} \quad (13)$$

is used to determine the average true airspeed ($V_E$) for an economy descent. Next the horizontal descent distance form the current altitude to 10,500 feet ($\Delta$ $MILES_2$) is corrected for wind and the result added to the previously calculated descent distance to go below 10,500 feet ($MILES_5$) using the equation:

$$MILES_6 = MILES_5 + \Delta MILES_2 \left( 1 + \frac{WIND_D}{V_E} \right) \quad (14)$$

Obviously, if the aircraft is above 10,500 feet, it may still be in cruise flight, thus, a deceleration to $IAS_E$ may be necessary. Alternatively, the aircraft may be decelerating but may not have yet reached $IAS_E$. In order to determine the additional horizontal distance required for a deceleration to $IAS_E$, it is first necessary to convert current airspeed (IAS) to true airspeed (V). This information is obtained by using Equation (12) substituting $\delta$ for $\delta_{MID}$; $\sigma$ for $\sigma_{MID}$; and IAS for $IAS_E$. ($\delta$ and $\sigma$ are values calculated during the data conditioning subroutine and IAS is obtained from the central air data computer, as previously described.)

As will be readily appreciated by those skilled in the aircraft art, each jet aircraft has a recommended maximum descent Mach number ($M_D$); and, the descent speed of the aircraft cannot exceed the indicated airspeed equivalent of $M_D$. In order to keep $IAS_E$ within this limit, $M_D$ is first converted to a related indicated airspeed ($IAS_M$) for the current altitude in accordance with Equation (5), substituting $M_D$ for $M_{RC}$. Thereafter, the initial descent airspeed ($IAS_D$) is set equal to the most economical descent speed ($IAS_E$) unless $IAS_E$ is greater than $IAS_M$. In the latter case, $IAS_D$ is set equal to $IAS_M$. The next step in the descent mode subroutine illustrated in FIG. 13C is to convert the desired descent airspeed ($IAS_D$) to true airspeed ($V_D$). $V_D$ is obtained using Equation (13) substituting $V_D$ for $V_E$, $\delta$ for $\delta_{MID}$, $\sigma$ for $\sigma_{MID}$ and $IAS_D$ for $IAS_E$. Further, the target indicated airspeed ($TIAS_2$) is now set equal to $IAS_D$.

At this point, the actual average true airspeed (V) is known and the desired initial descent true airspeed ($V_D$) is known. As a result, a determination can be made as to whether or not the actual average true airspeed (V) is greater than a desired initial descent true airspeed ($V_D$). This comparison step is shown in the upper block of FIG. 13D. If V is not greater than $V_D$, the previously calculated horizontal distance to touchdown, $MILES_6$, is displayed along with the value of $TIAS_2$, and any other desired information. In addition to creating the MILES and TIAS displays, the Mach/airspeed and EPR bugs are driven to the related position, if the ENGAGE button is actuated.

If V is greater than $V_D$, the additional horizontal distance covered for an aircraft deceleration from V to $V_D$ is determined from a table stored in the memory of the data processor. More specifically, for a known value of V, the horizontal deceleration distance ($DECEL_2$) is related to the difference between V and $V_D$. As before, the table information is illustrated in graphical form in FIG. 13D and is obtained from computer aircraft "flight" tests or actual aircraft model flights. After $DECEL_2$ is determined, $MILES_6$ is updated by adding to it $DECEL_6$, corrected for wind, in accordance with the formula:

$$MILES_7 = MILES_6 + DECEL_2 \left(1 + \frac{WIND_D}{V}\right) \quad (15)$$

Thereafter, the display displays $MILES_7$ and $TIAS_2$, plus any other desired information. Further, the TEPR values are set to idle thrust. As before, the Mach/airspeed and EPR bugs are driven to their respective positions, if the ENGAGE button is actuated.

Figure 13E:
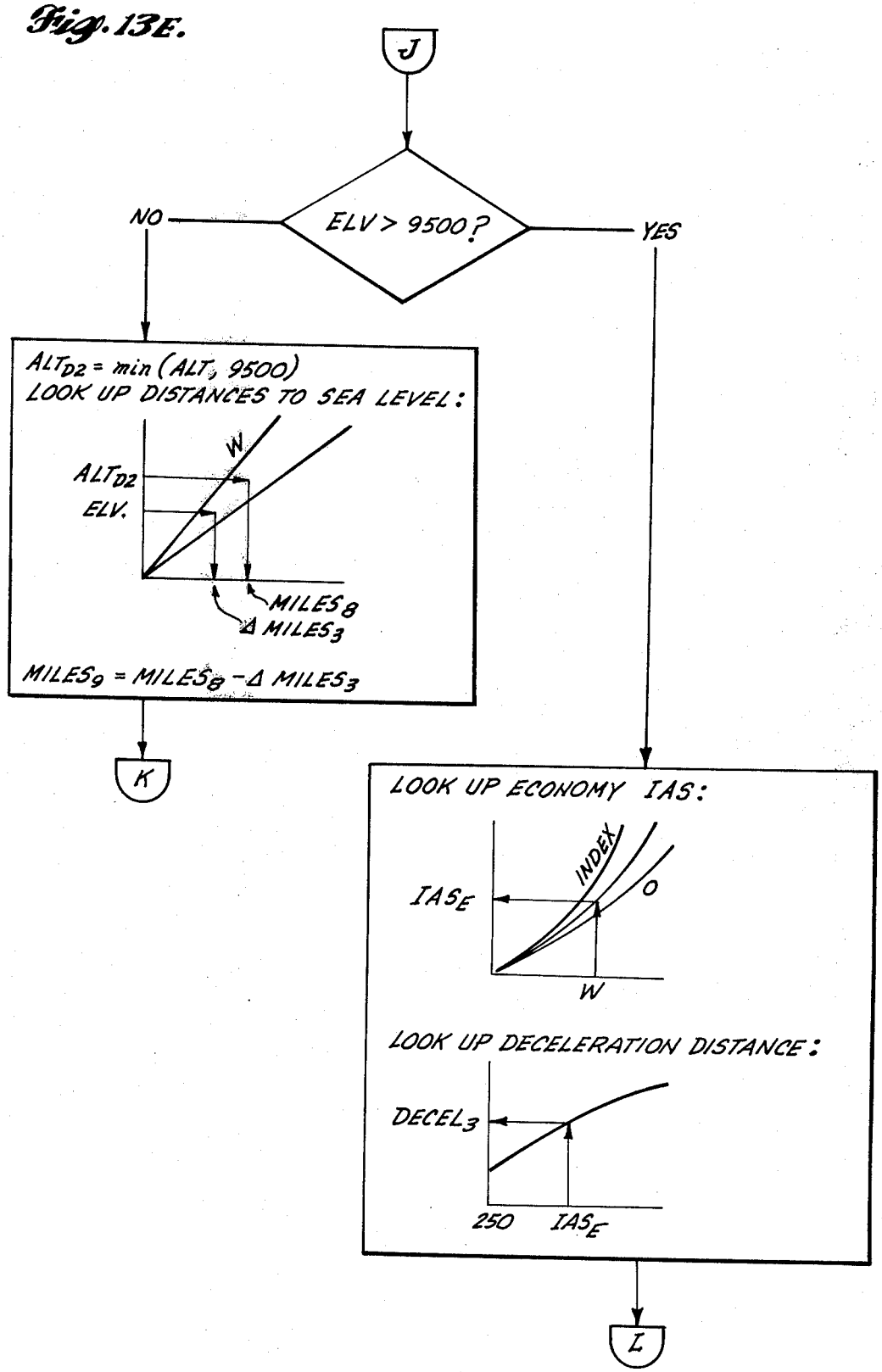
Figure 13F:
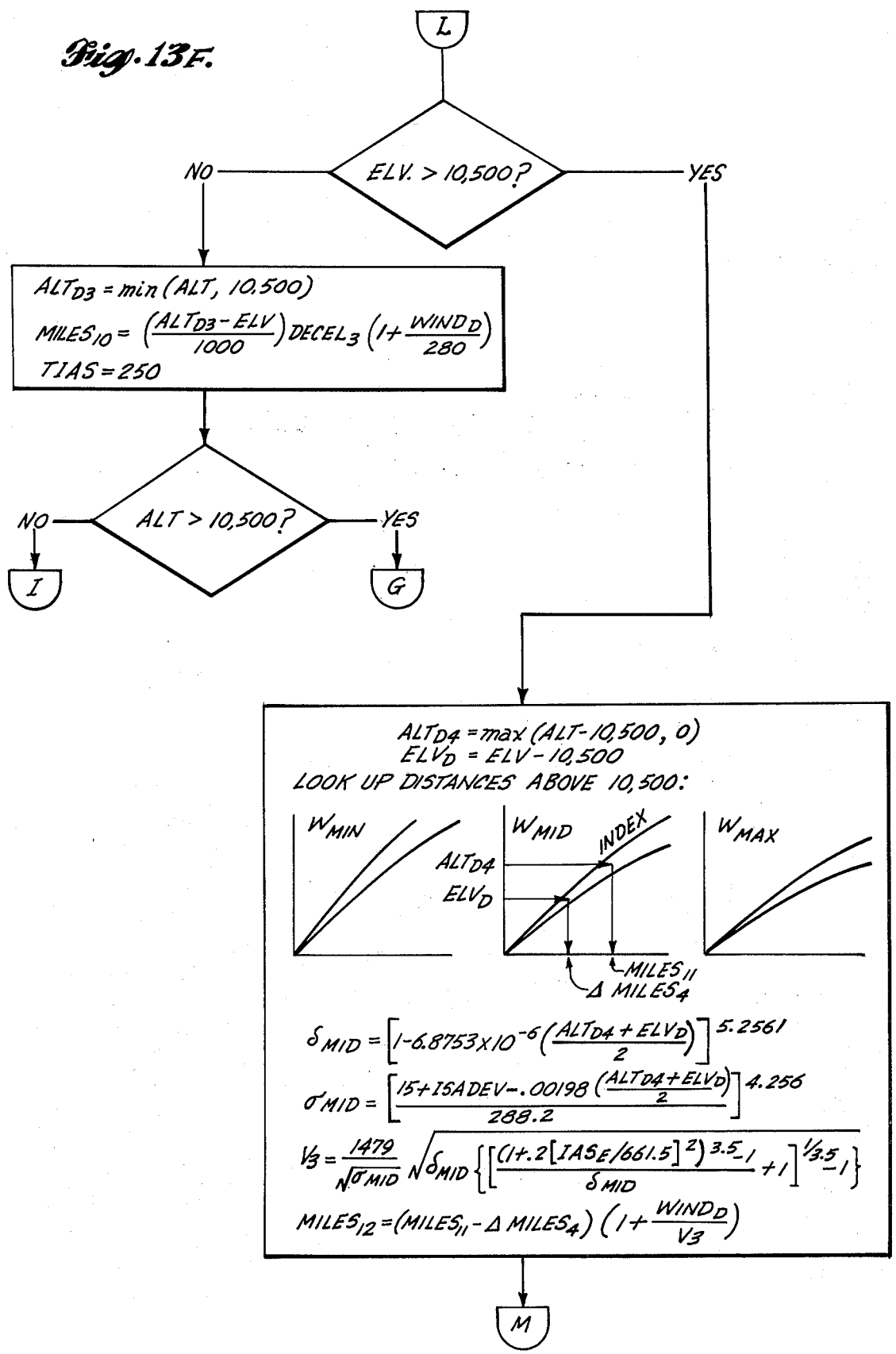

The foregoing description of FIGS. 13A–13D covers the paths of the descent mode subroutine that can be followed when the no navigation beacon crossing altitude (ELV) has been entered. The exact path followed is, of course, determined by the position of the aircraft along the descent profile. FIGS. 13E and 13F illustrate the paths of descent routine that are followed when the crossing altitude of a navigation beacon has been entered. As will be readily appreciated from the foregoing discussion of FIG. 12, these paths, where appropriate, interconnect with the paths followed when no navigation beacon altitude has been entered by the pilot. As also previously discussed, the MILES display that occurs when a beacon altitude has been entered is the miles to the beacon, as opposed to the miles to touchdown.

Turning now to FIG. 13E, after the descent mode subroutine has determined that an ELV value has been entered by the pilot, a determination of whether or not ELV is above or below 9,500 feet is made. If ELV is less than 9,500 feed, an intermediate altitude value ($ALT_{D2}$) is set to the minimum of ALT or 9,500 feet. Then the horizontal distance for a descent to sea level from $ALT_{D2}$ and ELV are looked up in the table previously described with respect to FIG. 13A, i.e., the table used to determine the $MILES_1$ and $\Delta MILES_1$ values for $ALT_D$ and DELV, respectively, based on aircraft gross weight (W). The horizntal distance from $ALT_{D2}$ to sea level is denoted $MILES_8$ and the horizontal distance from ELV to sea level is denoted $\Delta MILES_3$. After $MILES_8$ and $\Delta MILES_3$ are determined, the horizontal distance for a descent at 250 knots (or other appropriate value) between $ALT_{D2}$ and ELV is determined by subtracting $\Delta MILES_3$ from $MILES_8$. The result is denoted $MILES_9$. At this point, as previously described with respect to FIG. 12, the descent mode subprogram shifts from the "navigation beacon" path to the "runway" path just above the point when the target indicated airspeed (TIAS) is set equal to 250 knots (point K). Thereafter, based on actual aircraft altitude (ALT), one of the runway paths is followed.

If ELV is above 9,500 feet, the economy indicated airspeed ($IAS_E$) is determined. $IAS_E$ is determined by looking up a value in a suitable table relating gross weight and INDEX number. The table is the same as the table illustrated in FIG. 13B and previously described. Following a determination of the value of $IAS_E$, a determination of the horizontal deceleration distance ($DECEL_3$) needed for a deceleration to 250 knots from $IAS_E$ is made. Again, this information is looked up in a stored table. The appropriate table is illustrated in FIG. 13B and previously described. Specifically, the table used to determine the value of $DECEL_3$ is the same as the table used to determine the value of $DECEL_1$, previously described.

After the values of $IAS_E$ and $DECEL_3$ have been determined, the descent mode subroutine shifts to the portion thereof illustrated in FIG. 13F (point L). The first step of this portin of the descent mode subroutine is to determine whether or not ELV is above or below 10,500 feet. If ELV is below 10,500 feet, an intermediate altitude value ($ALT_{D3}$) is set to the minimum of ALT or 10,500 feet. Next, the deceleraion distance is ratioed and corrected for wind in accordance with the equation:

$$MILES_{10} = \left(\frac{ALT_{D3} - ELV}{1000}\right) DECEL_3 \left(1 + \frac{WIND_D}{280}\right)^{(16)}$$

Next, the target indicated airspeed (TIAS) is set equal to 250 knots.

The next step of the descent mode subroutine if ELV is below 10,500 feet, is to determine whether or not ALT is above or below 10,500 feet. If ALT is below 10,500 feet, the descent mode subroutine shifts to the display step and $MILES_{10}$ and a TIAS of 250 knots are displayed, along with other desired information, as previously discussed. If ALT is above 10,500 feet, the descent mode subroutine shifts to the "runway" paths just above the step (point G) where an $ALT_{D1}$ value is determined.

If ELV is above 10,500 feet, as illustrated on the right of FIG. 13F, an intermediate altitude vaue ($ALT_{D4}$) is set equal to the maximum of ALT−10,500 feet or zero. In addition, an intermediate crossing altitude value ($ELV_D$) is set equal to ELV−10,500 feet. Thereafter, the horizontal distance figures related to $ALT_{D3}$ ($MILES_{11}$) and $ELV_D$ ($\Delta MILES_4$) for a descent to 10,500 feet are derived from the tables previously described with respect to FIG. 13C for a determination of $ALT_{D1}$ (i.e., the tables that relate horizontal distance to altitude based on aircraft gross weight and index value).

Subsequent to $MILES_{11}$ and $\Delta MILES_4$ being determined, an average true airspeed ($V_3$) is determined by first calculating values for $\delta$ and $\sigma$ at an altidue midway between the intermediate current altitude value ($ALT_{D4}$) and the intermediate crossing altitude value ($ELV_D$). $\delta_{MID}$ is determined in accordance with Equation 11, substituting $ALT_{D4}$ for $ALT_D$ and $ELV_D$ for 10500. $\delta_{MID}$ is determined in accordance with Equation 12 substituting $ALT_{D3}$ for $ALT_D$ and $ELV_D$ for 10500. After $\delta_{MID}$ and $\sigma_{MID}$ have been determined, $V_3$ is determined in accordance with Equation 13. Finally, a final horizontal distance value ($MILES_{12}$) is determined in accordance with the following equation:

$$MILES_{12} = (MILES_{11} - \Delta MILES_4)\left(1 + \frac{WIND_D}{V_3}\right) \quad (17)$$

The descent mode subroutine now shifts to the "runway" path prior to the point where a descent speed is determined (point M). Thereafter, the appropriate "runway" path is followed and a suitable display is created.

In summary, as is previously setforth, the descent mode subroutine has two principal sets of paths. One set includes paths that are followed when an ELV value is not entered or inserted by the pilot (runway paths). The other set includes paths that are followed when an ELV value is entered (navigation beacon paths). The navigation beacon paths joins the runway paths, as appropriate. In the case of the runway paths, the miles display relates to the touchdown point, i.e., the runway threshold at the destination airport. In the case of the navigation beacon paths (including those that join the runway paths), the miles display is to the point where the navigation beacon is located. In the latter case, anytime the miles display goes negative (i.e., the aircraft is between the navigation beacon and the runway), the miles display is zeroed.

Figure 14:
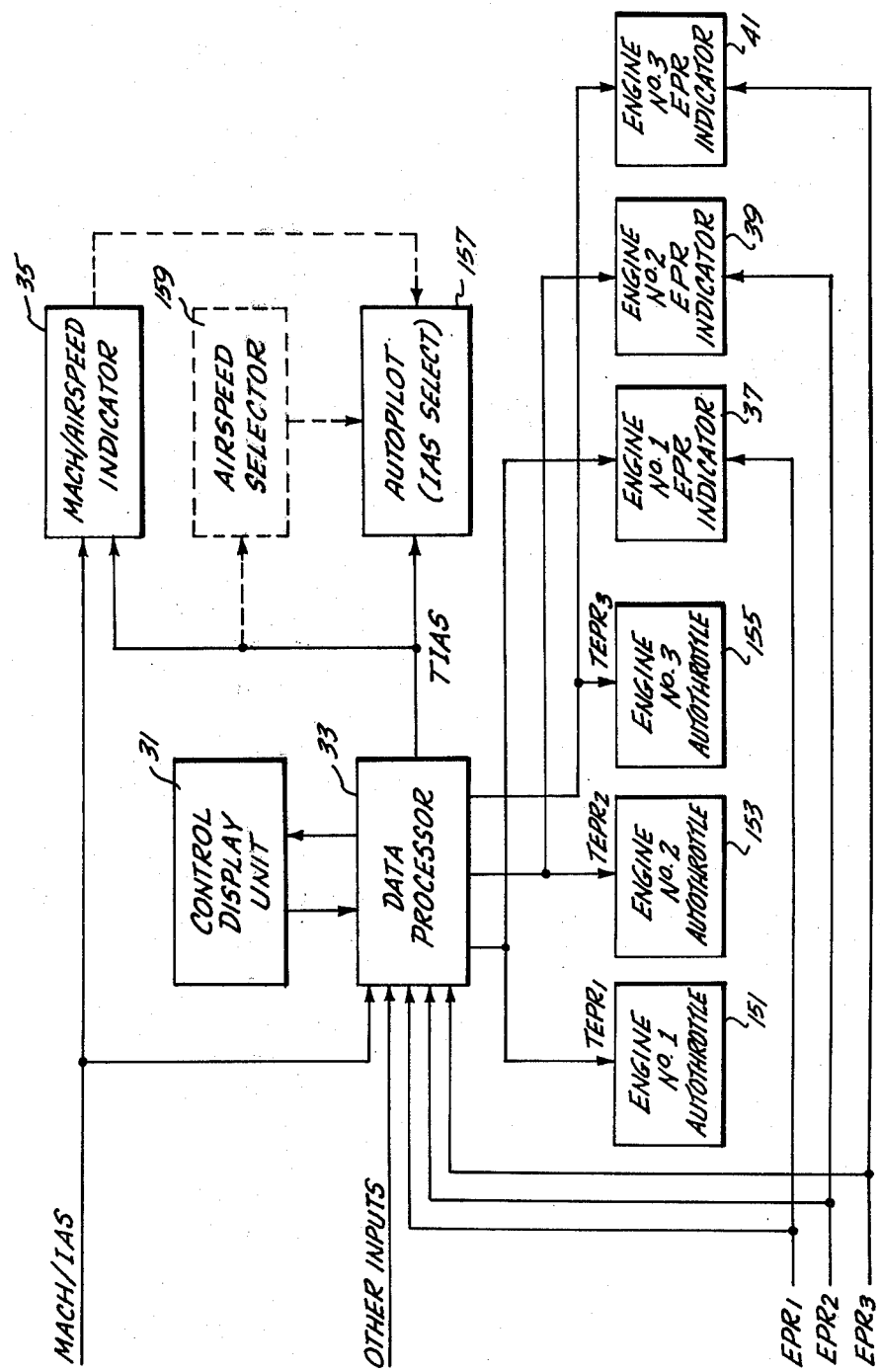

As illustrated in FIG. 14, in addition to controlling the bugs on EPR and airspeed indicators, the TIAS and TEPR signals can be used via autothrottles and an autopilot to directly control the aircraft. More specifically, FIG. 14 illustrates, (in block form): the control display unit 31; the data processor 33; the Mach/airspeed indicator 35; and, three EPR indicators 37, 39 and 41. In addition, FIG. 14 includes (also in block form) three autothrottles, 151, 153 and 155; and, an autopilot 157.

As with the previously described embodiments of the invention, the data processor 33 receives a Mach/IAS signal, engine pressure ratio signals (denoted $EPR_1$, $EPR_2$ and $EPR_3$) and signals from other aircraft subsystems and sensors. Further, the data processor 33 is connected to the control display unit 31 so as to receive control signals from the control display unit; and, to control an alphanumeric display. In addition, the data processor produces a target indicated airspeed (TIAS) signal that is applied to the Mach/airspeed indicator to control a bug located on the Mach/airspeed indicator. The Mach/airspeed indicator also receives the Mach/IAS signal. The TIAS signal is also applied to the autopilot, which in the solid line embodiment of the invention illustrated in FIG. 14 is an indicated airspeed (IAS) select autopilot, i.e., an autopilot that functions in accordance with indicated airspeed.

Also as previously discussed, the data processor 33 produces a target engine pressure ratio signal for each engine. These signals (denoted $TEPR_1$, $TEPR_2$ and $TEPR_3$) are applied to their respective EPR indicators 37, 39 and 41. Further, the TEPR signals are applied to the autothrottle of the related engine. Specifically, $TEPR_1$ is applied to the autothrottle 151 for Engine No. 1; $TEPR_2$ is applied to the autothrottle 153 for Engine No. 2; and $TEPR_3$ is applied to the autothrottle for Engine No. 3.

In operation, the target EPR signals control the setting of the engine autothrottles. In addition, the autopilot 157 controls the aircraft attitude during climb and descent so that the target indicated airspeed is achieved. As a result, the pilot is reduced to monitoring the operation of aircraft, as opposed to flying the aircraft.

Illustrated in dash form in FIG. 14 is an alternative arrangement for controlling an autopilot. More specifically, some autopilots attempt to zero out speed differences between a desired airspeed and an actual airspeed, rather than attempt to achieve a desired airspeed. In such autopilots, an airspeed selector 159 is adjusted to the desired airspeed by the pilot. The autopilot compares the desired airspeed with the actual airspeed and controls the aircraft, so that the desired airspeed is achieved. The invention is useful with such a system. Specifically, the TIAS signal is applied to the airspeed selector via a suitable electromechanical control system so as to control the value of the desired airspeed, as indicated by the dask lines in FIG. 14. In a conventional manner, the autopilot compares the speed set by the invention with the actual airspeed and controls the plane so that the TIAS value is achieved. Regardless of how autopilot control is achieved during cruise, when the autopilot is holding a constant pressure altitude, it should be disconnected from the data processor. This can be accomplished by providing a disconnect when the cruise mode is engaged.

While it is possible to eliminate the bugs of the EPR and Mach/airspeed indicators in an autopilot/autothrottle system, it will be appreciated that it would be undesirable to do so in most aircraft. That is, it is desirable in most aircraft to have a pilot monitoring capability regardless of the reliability of automatic systems. Hence, in most aircraft, it will be desirable to retain the EPR and Mach/airspeed bugs, even though the signals used to drive these bugs are also utilized to control autothrottles and an autopilot. In addition, the invention can be used with aircraft control systems that use a single autothrottle to control several engines via a motor clutch arrangement by, for example, averaging the TEPR signals and using the average TEPR signal to control the single autothrottle.

To summarize, the invention provides an economy performance data avionics system that produces the most economical engine pressure ratio and airspeed information in readily useful form for the climb, cruise and descent phases of a jet aircraft flight. The pilot inserts certain information via a CDU. Preferably, the pilot inserted information is inserted prior to takeoff, even though it can be inserted at any point during the flight. Moreover, the inserted information can be changed, if necessary. Among the inserted information is a dimensionless INDEX number that represents a chosen relationship between fuel costs and trip time costs. This number, in essence, controls the flight so that the most economical engine pressure ratio and airspeed information is provided. In addition to the pilot inserted information, information is obtained from other aircraft systems and sensors. The total information is utilized by a data processor to produce signals. The signals control bugs on EPR and Mach/airspeed instruments; and, may control autothrottles and an autopilot. If autothrottles or an autopilot are not being used, the pilot causes the aircraft to follow the desired flight profile by first adjusting the aircraft's throttles so that the EPR needles point toward the EPR bugs and, then, during climb and descent, adjusting the attitude of the aircraft so that the Mach/airspeed needle points toward the Mach/airspeed instrument bug. If the aircraft has drag and thurst characteristics that vary from a nominal value, the data processor compensates for these pecularities by changing the vaue of a self-correction factor (K) during cruise. The self-correction factor modifies the target EPR values during the cruise mode of operation such that the target airspeed can be achieved for the displayed EPR values.

While a preferred embodiment of the invention has been illustrated and described, it will be appreciated that various changes can be made therein without departing from the spirit and scope of the invention. For example, as noted above, in some jet engines thurst is controlled in terms of some parameter other than $EPR_1$ such as "low pressure" rotor speed ($N_1$). In such a situation $N_1$ can be substituted for EPR throughout the previous description; and, related tables stored in $N_1$, rather than EPR form. Hence, the invention can be practiced otherwise than as specifically described herein.

The embodiments of the invention in which an exclusive property or privilege is claimed are defined as follows:

1. An economy performance data avionic system for a jet aircraft for producing the most economical engine thrust and speed information for the various phases of a flight, said jet aircraft including at least one jet engine and sensors and subsystems for producing an actual thurst signal for each jet engine, an actual speed signal representing the speed of said aircraft, and an altitude signal representing the altitude of said aircraft, said economy performance data avionic system comprising:

speed indicator means including a first display means connected to the appropriate one of said sensors and subsystems of said aircraft for receiving said actual speed signal and producing a display of said actual speed of said aircraft, said speed indicator means including a second display means for displaying the most economical speed of said aircraft;

thrust indicator means including thrust indicators equal in number to the number of jet engines of said jet aircraft, each of said thrust indicators including a first display means connected to the appropriate one of said sensors and subsystems of said aircraft for receiving said actual thrust signal related to one of said jet engines and producing a first display displaying the actual thrust of said one of said jet engines, each of said thrust indicators including a second display means for displaying the most economical thrust for the related one of said jet engines;

a control display unit for receiving manually inserted mode of operation and parameter information and producing, in accordance therewith, mode of operation and parameter data signals, said parameter information including a dimensionless INDEX number that represents a chosen relationship between fuel costs and trip time costs; and, a data processor connected to said control display unit for receiving said mode of operation and said parameter data signals and connected to said sensors and subsystems of said aircraft for receiving said actual thrust signals, said actual speed signal and said altitude signal, said data processor including a memory having stored therein, in tabular form, data related to said aircraft, said data processor determining the most economical thrust and speed of said aircraft for the various phases of a flight based on said mode of operation, parameter data, actual thrust, actual speed and altitude signals and on said data stored in tabular form in said memory and, in accordance therewith, produce economy thrust and economy speed control signals related to said most economical thrust and speed, said economy thrust control signals being applied to said thrust indicators for controlling the second displays of said thrust indicators and said economy speed control signal being applied to said speed indicator means for controlling the second display of said speed indicator means.

2. An economy performance data avionic system as claimed in claim 1 wherein said speed indicator means includes a graduated dial, and wherein said first display means of said speed indicator means comprises a needle mounted so as to point toward said graduated dial and said second display means of said speed indicator means comprises a bug mounted so as to coact with said graduated dial.

3. An economy performance data avionic system as in claim 2 wherein each of said thrust indicators includes a graduated dial and wherein said first display means of each of said thrust indicators comprises a needle mounted so as to point toward said graduated dial and said second display means of each of said thrust indicators comprises a bug mounted so as to coact with said graduated dial.

4. An economy performance data avionic system as claimed in claim 3 wherein said thrust signals are engine pressure ratio (EPR) signals and said thrust indicators are EPR indicators.

5. An economy performance data avionic system as claimed in claim 3 wherein said thrust signals are low pressure rotor speed ($N_1$) signals and said thrust indicators are $N_1$ indicators.

6. An economy performance data avionic system as claimed in claim 3 wherein:

said data processor produces alphanumeric display control signals; and, said control display unit includes an alphanumeric display means for receiving said alphanumeric display control signals produced by said data processor and producing an alphanumeric display in accordance therewith.

7. An economy performance data avionic system as claimed in claim 6 wherein said control display unit also includes a keyboard, said parameter information being manually inserted via said keyboard.

8. An economy performance data avionic system as claimed in claim 7 wherein said control display unit also includes a speed/thrust mode select switch, said mode of operation information being manually inserted via said speed/thrust mode select switch.

9. An economy performance data avionic system as claimed in claim 8 wherein said speed/thrust mode select switch includes at least climb, cruise and descent positions and wherein the nature of said alphanumeric display control signals relate to the position of said speed/thrust mode select switch.

10. An economy performance data avionic system as claimed in claim 8 wherein said alphanumeric display produced by said control display unit includes a target indicated airspeed display when said speed/thrust mode select switch is in any one of said climb, cruise and descent positions and a target thrust display when said speed/thrust mode select switch is in either one of said climb and cruise positions.

11. An economy performance data avionic system as claimed in claim 10 wherein said control display unit includes an engage button that, when actuated, causes said economy thrust control signals and said economy speed control signal to move the bugs of said thrust indicators and said speed indicator means to the positions defined by the target thrust displays and said target indicated airspeed displays, respectively.

12. An economy performance data avionic system as claimed in claim 11 wherein said data processor determines a self-correction factor and selectively modifies said target thrust displays and said economy thrust control signals in accordance therewith.

13. An economy performance data avionic system as claimed in claim 12 wherein said data processor includes a data conditioning subroutine that averages said actual thurst signal, said actual speed signal and said altitude signal received from said jet aircraft sensors and subsystems over a predetermined time period prior to said signals being used by said data processor to determine the most economical thrust and speed of said aircraft.

14. An economy performance data avionic system as claimed in claim 13 wherein said data processor also includes a climb mode subroutine that is entered when said speed/thrust mode select switch is in said climb position, a cruise mode subroutine that is entered into when said speed/thrust mode select switch is in said cruise position and a descent mode subroutine that is entered when said speed/thrust mode select switch is in said descent position.

15. An economy performance data avionic system as claimed in claim 14 wherein said descent mode subroutine determines the distance needed to descent from the actual altitude and speed of said aircraft to the destination of said aircraft and produces a miles display control signal in accordance therewith; and wherein said control display unit receives said miles display control signal produced by said data processor and, in accordance therewith, creates a miles display on said alphanumeric display means of said control display unit.

16. An economy performance data avionic system as claimed in claim 14 wherein said descent mode subroutine determines the distance need to descent from the actual altitude and speed of said aircraft to a specified lower altitude and produces a miles display control signal in accordance therewith; and wherein said control display unit receives said miles display control signal produced by said data processor and in accordance therewith, creates a miles display on said alphanumeric display means of said control display unit.

17. An economy performance data avionic system as claimed in claim 1 wherein each of said thrust indicators includes a graduated dial and wherein said first display means of each of said thrust indicators comprises a needle mounted so as to point toward said graduated dial and said second display means of each of said thrust indicators comprises a bug mounted so as to coact with said graduated dial.

18. An economy performance data avionic system as claimed in claim 1 wherein said thrust signals are engine pressure ratio (EPR) signals and said thrust indicators are EPR indicators.

19. An economy performance data avionic system as claimed in claim 1 wherein said thrust signals are low pressure rotor speed ($N_1$) signals and said thrust indicators and $N_1$ indicators.

20. An economy performance data avionic system as claimed in claim 1 wherein:
said data processor produces alphanumeric display control signals; and,
said control display unit includes an alphanumeric display means for receiving said alphanumeric display control signals produced by said data processor and producing an alphanumeric display in accordance therewith.

21. An economy performance data avionic system as claimed in claim 20 wherein said control display unit also includes a keyboard, said parameter information being manually inserted via said keyboard.

22. An economy performance data avionic system as claimed in claim 21 wherein said control display unit also includes a speed/thrust mode select switch, said mode of operation information being manually inserted via said speed/thrust mode select switch.

23. An economy performance data avionic system as claimed in claim 22 wherein said speed/thrust mode select switch includes at least climb, cruise and descent positions and wherein the nature of said alphanumeric display control signals relate to the position of said speed/thrust mode select switch.

24. An economy performance data avionic system as claimed in claim 23 wherein said alphanumeric display produced by said control display unit includes a target indicated airspeed display when said speed/thrust mode select switch is in any one of said climb, cruise and descent positions and a target thrust display when said speed/thrust mode select switch is in either one of said climb and cruise positions.

25. An economy performance data avionic system as claimed in claim 24 wherein said control display unit includes an engage button that, when actuated, causes said economy thrust control signals and said economy speed signal to cause the second display means of said thrust indicators and said speed indicator means to move to the positions defined by said target thrust displays and said target indicated airspeed displays, respectively.

26. An economy performance data avionic system as claimed in claim 25 wherein said data processor determines a self-correction factor and selectively modifies said economy thrust control signals in accordance therewith.

27. An economy performance data avionic system as claimed in claim 26 wherein said data processor includes a data conditioning subroutine that averages said actual thrust signal, said actual speed signal and said altitude signal received from said jet aircraft sensors and subsystems over a predetermined time period prior to said signals being used by said data processor to determine the most economical thrust and speed of said aircraft.

28. An economy performance data avionic system as claimed in claim 27 wherein said data processor also includes a climb mode subroutine that is entered when said speed/thrust mode select switch is in said climb position, a cruise mode subroutine that is entered into when said speed/thrust mode select switch is in said cruise position and a descent mode subroutine that is entered when said speed/thrust mode select switch is in said descent position.

29. An economy performance data avionic system as claimed in claim 28 wherein said descent mode subroutine determines the distance needed to descent from the actual altitude and speed of said aircraft to the destination of said aircraft and produces a miles display control signal in accordance therewith; and wherein said control display unit receives said miles display control signal produced by said data processor and, in accordance therewith, creates a miles display.

30. An economy performance data avionic system as claimed in claim 28 wherein said descent mode subroutine determines the distance needed to descent from the actual altitute and speed of said aircraft to a specified lower altitude and produces a miles display control signal in accordance therewith; and wherein said control display unit receives said miles display control signal produced by said data processor and, in accordance therewith, creates a miles display.

31. An economy performance data avionic system as claimed in claim 1 wherein said control display unit includes a keyboard, said parameter information being manually inserted via said keyboard.

32. An economy performance data avionic system as claimed in claim 1 wherein said control display unit includes a speed/thrust mode select switch having at least climb, cruise and descent positions, said mode of operation being manually inserted via said speed/thrust mode select switch.

33. An economy performance data avionic system as claimed in claim 32 wherein said data processor includes a climb mode subroutine that is entered when said speed/thrust mode select switch is in said climb position, a cruise mode subroutine that is entered into when said speed/thrust mode select switch is in said cruise position and a descent mode subroutine that is entered when said speed/thrust mode select switch is in said descent position, said climb, cruise and descent subroutines determining said most economical thrust and speed of said aircraft for the climb, cruise and descent phases of a flight of said aircraft.

34. An economy performance data avionic system as claimed in claim 33 wherein said descent mode subroutine determines the distance needed to descend from the actual altitude and speed of said aircraft to the destination of said aircraft and produces a miles display control signal in accordance therewith; and wherein said control display unit receives said miles display control signal produced by said data processor and, in accordance therewith, creates a miles display.

35. An economy performance data avionic system as claimed in claim 33 wherein said descent mode subroutine determines the distance needed to descend from the actual altitude and speed of said aircraft to a specified lower altitude and produces a miles display control signal in accordance therewith; and wherein said control display unit receives said miles display control signal produced by said data processor and, in accordance therewith, creates a miles display.

36. An economy performance data avionic system as claimed in claim 1 wherein said data processor determines a self-correction factor and selectively modifies said economy thrust control signals in accordance therewith.

37. An economy performance data avionic system for controlling a jet aircraft so that the aircraft follows the most economical flight path between takeoff and landing, said jet aircraft including: at least one jet engine; an autopilot; an antothrottle system for controlling the thrust of the jet engines of said aircraft; and, sensors and subsystems for producing an actual thrust signal for each jet engine, an actual speed signal representing the speed of said aircraft, and an altitude signal representing the altitude of said aircraft, said economy performance data avionic system comprising:

a control display unit for receiving manually inserted mode of operation and parameter information and producing, in accordance therewith, mode of operation and parameter data signals, said parameter information including a dimensionless INDEX number that represents a chosen relationship between fuel costs and trip time costs; and, a data processor connected to said control display unit for receiving said mode of operation and said parameter data signals and connected to said sensors and subsystems of said aircraft for receiving said actual thrust signals, said actual speed signal and said altitude signal, said data processor including a memory having stored therein, in tabular form, data related to said aircraft, said data processor determining the most economical thrust and speed of said aircraft for the various phases of a flight based on said mode of operation, parameter data, actual thrust, actual speed and altitude signals and on said data stored in tabular form in said memory and, in accordance therewith, produce economy thrust and economy speed control signals related to said most economical thrust and speed, said economy thrust control signals being applied to said autothrottle system for controlling the thrust of said jet engines of said aircraft and said economy speed control signal being applied to said autopilot for selectively controlling the speed of said aircraft.

38. An economy performance data avionic system as claimed in claim 37 wherein:

said data processor produces alphanumeric display control signals; and, said control display unit includes an alphanumeric display means for receiving said alphanumeric display control signals produced by said data processor and producing an alphanumeric display in accordance therewith.

39. An economy performance data avionic system as claimed in claim 38 wherein said control display unit also includes a keyboard, said parameter information being manually inserted via said keyboard.

40. An economy performance data avionic system as claimed in claim 39 wherein said control display unit also includes a speed/thrust mode select switch, said mode of operation information being manually inserted via said speed/thrust mode select switch.

41. An economy performance data avionic system as claimed in claim 40 wherein said speed/thrust mode select switch includes at least climb, cruise and descent positions and wherein the nature of said alphanumeric display control signals relates to the position of said speed thrust mode select switch.

42. An economy performance data avionic system as claimed in claim 41 wherein said alphanumeric display produced by said control display unit includes a target indicated airspeed display when said speed/thrust mode select switch is in any one of said climb, cruise and descent positions and a target thrust display when said speed/thrust mode select switch is in either one of said climb and cruise positions.

43. An economy performance data avionic system as claimed in claim 42 wherein said control display unit includes an engage button that, when actuated, causes said economy thrust control signals and said economy speed signal to control said autothrottle system and said autopilot, respectively.

44. An economy performance data avionic system as claimed in claim 43 wherein said data processor determines a self-correction factor and selectively modifies said target thrust displays and said economy thrust control signals in accordance therewith.

45. An economy performance data avionic system as claimed in claim 44 wherein said data processor includes a data conditioning subroutine that averages said actual thrust signal, said actual speed signa and said altitude signal received from said jet aircraft sensors and subsystems over a predetermined time period prior to said signals being used by said data processor to determine the most economical thrust and speed of said aircraft.

46. An economy performance data avionic system as claimed in claim 45 wherein said data processor also includes a climb mode subroutine that is entered when said speed/thrust mode select switch is in said climb position, a cruise mode subroutine that is entered into when said speed/thrust mode select switch is in said cruise position and a descent mode subroutine that is entered when said speed/thrust mode select switch is in said descent position.

47. An economy performance data avionic system as claimed in claim 46 wherein said descent mode subroutine determines the distance needed to descend from the actual altitude and speed of said aircraft to the destination of said aircraft and produces a miles display control signal in accordance therewith; and wherein said control display unit receives said miles display control signal produced by said data processor and, in accordance therewith, creates a miles display on said alphanumeric display means of said control display unit.

48. An economy performance data avionic system as claimed in claim 46 wherein said descent mode subroutine determines the distance needed to descend from the actual altitude and speed of said aircraft to a specified lower altitude and produces a miles display control signal in accordance therewith; and wherein said control display unit receives said miles display control signal produced by said data processor and in accordance therewith, creates a miles display on said alphanumeric display means of said control display unit.

49. At economy performance data avionic system as claimed in claim 41 wherein said data processor determines a self-correction factor and selectively modifies said economy thrust control signals in accordance therewith.

50. An economy performance data avionic system as claimed in claim 49 wherein said data processor includes a data conditioning subroutine that averages said actual thrust signal, said actual speed signal and said altitude signal received from said jet aircraft sensors and subsystems over a predetermined time period prior to said signals being used by said data processor to determine the most economical thrust and speed of said aircraft.

51. An economy performance data avionic system as claimed in claim 50 wherein said data processor also includes a climb mode subroutine that is entered when said speed/thrust mode select switch is in said climb position, a cruise mode subroutine that is entered into when said speed/thrust mode select switch is in said cruise position and a descent mode subroutine that is entered when said speed/thrust mode select switch is in said descent position.

52. An economy performance data avionic system as claimed in claim 51 wherein said descent mode subroutine determines the distance needed to descend from the actual altitude and speed of said aircraft to the destination of said aircraft and produces a miles display control signal in accordance therewith; and wherein said control display unit receives said miles display control signal produced by said data processor and, in accordance therewith, creates a miles display.

53. An economy performance data avionic system as claimed in claim 51 wherein said descent mode subroutine determines the distance needed to descend from the actual altitude and speed of said aircraft to a specified lower altitude and produces a miles display control signal in accordance therewith; and wherein said control display unit receives said miles display control signal produced by said data processor and, in accordance therewith, creates a miles display.

54. An economy performance data avionic system as claimed in claim 37 wherein said control display unit also includes a keyboard, said parameter information being manually inserted via said keyboard.

55. An economy performance data avionic system as claimed in claim 37 wherein said control display unit includes a speed/thrust mode select switch having at least climb, cruise and descent positions, said mode of operation information being manually inserted via said speed/thrust mode select switch.

56. An economy performance data avionic system as claimed in claim 55 wherein said data processor includes a climb mode subroutine that is entered when said speed/thrust mode select switch is in said climb position, a cruise subroutine that is entered in when said speed/thrust mode select switch is in said cruise position and a descent mode subroutine that is entered when said speed/thrust mode select switch is in said descent position, said climb, cruise and descent subroutines determining said most economical thrust and speed of said aircraft for the climb, cruise and descent phases of a flight of said aircraft.

57. An economy performance data avionic system as claimed in claim 56 wherein said descent mode subroutine determines the distance needed to descend from the actual altitude and speed of said aircraft to the destination of said aircraft and produces a miles display control signal in accordance therewith; and wherein said control display unit receives said miles display control signal produced by said data processor and, in accordance therewith, creates a miles display.

58. An economy performance data avionic system as claimed in claim 56 wherein said descent mode subroutine determines the distance needed to descend from the actual altitude and speed of said aircraft to a specified lower distance and produces a miles display control signal in accordance therewith; and within said control display unit receives said miles display control signal produced by said data processor and, in accordance therewith, creates a miles display.

59. An economy performance data avionic system as claimed in claim 37 including:

speed indicator means including a first display means connected to the appropriate one of said sensors and subsystems of said aircraft for receiving said actual speed signal and producing a display of said actual speed of said aircraft, said speed indicator means including a second display means connected to said data processor for receiving said economy speed control signal and displaying the most economical speed of said aircraft; and, thrust indicator means including thrust indicators equal in number to the number of jet engines of said jet aircraft, each of said thrust indicators including a first display means connected to the appropriate one of said sensors and subsystems of said aircraft for receiving said actual thrust signal related to one of said jet engines and producing a first display displaying the actual thrust of said one of said jet engines, each of said thrust indicators including a second display means connected to said data processor for receiving a related one said economy thrust control signals and displaying the most economical thrust for the related one of said jet engines.

60. An economy performance data avionic system as claimed in claim 59 wherein said speed indicator means includes a graduated dial, and wherein said first display means of said speed indicator means comprises a needle mounted so as to point toward said graduated dial and said second display means of said speed indicator means comprises a bug mounted so as to coact with said graduated dial.

61. An economy performance data avionic system as claimed in claim 60 wherein each of said thrust indicators includes a graduated dial and wherein said first display means of each of said thrust indicators comprises a needle mounted so as to point toward said graduated dial and said second display means of each of said thrust indicators comprises a bug mounted so as to coact with said graduated dial.

62. An economy performance data avionic system as claimed in claim 61 wherein said thrust signals are engine pressure ratio (EPR) signals and said indicators are EPR indicators.

63. An economy performance data avionic system as claimed in claim 61 wherein said thrust signals are low pressure rotor speed ($N_1$) signals and said thrust indicators are $N_1$ indicators.

64. An economy performance data avionic system as claimed in claim 37 wherein said data processor determines a self-correction factor and selectively modifies said economy thrust control signals in accordance therewith.

* * * * *

UNITED STATES PATENT AND TRADEMARK OFFICE
CERTIFICATE OF CORRECTION

PATENT NO. : 4,325,123

DATED : April 13, 1982

INVENTOR(S) : Graham et al.

It is certified that error appears in the above—identified patent and that said Letters Patent is hereby corrected as shown below:

| | |
|---|---|
| Column 17, line 42; | "flow" should be -- flown -- |
| Column 21, line 3; | "display" should be -- displayed -- |
| Column 28, line 25; | "$\delta MID$" should be -- $\sigma MID$ -- |
| Column 28, line 48; | "form" should be -- from -- |
| Column 30, line 7; | "feed" should be -- feet -- |
| Column 31, line 2; | "vaue" should be -- value -- |
| Column 31, line 6; | "$ALT_{D3}$" should be -- $ALT_{D4}$ -- |
| Column 31, line 18; | "$ALT_{D4}$" (second occurrence) should be -- $ALT_{D1}$ -- |
| Column 31, line 20; | "$ALT_{D3}$" should be -- $ALT_{D4}$ -- |
| Column 32, line 37; | "dask" should be -- dash -- |

UNITED STATES PATENT AND TRADEMARK OFFICE
CERTIFICATE OF CORRECTION

PATENT NO. : 4,325,123

DATED : April 13, 1982

INVENTOR(S) : Graham et al.

It is certified that error appears in the above—identified patent and that said Letters Patent is hereby corrected as shown below:

Claim 1, Column 33, line 48;   "thurst" should be -- thrust --

Claim 16, Column 35, line 63;   "need" should be -- needed --

Claim 19, Column 36, line 18;   "and" should be -- are --

Claim 41, Column 39, line 6;   "speed thrust" should be -- speed/thrust --

Claim 45, Column 39, line 29;   "signa" should be -- signal --

Claim 49, Column 39, line 64;   "At" should be -- An --

Claim 56, Column 40, line 52;   Insert -- mode -- after "cruise"

Claim 62, Column 42, line 21;   Insert -- thrust -- after "said"

Signed and Sealed this

Sixth Day of September 1983

[SEAL]

*Attest:*

*Attesting Officer*

GERALD J. MOSSINGHOFF

*Commissioner of Patents and Trademarks*